United States Patent
Kim et al.

(10) Patent No.: US 12,356,284 B2
(45) Date of Patent: Jul. 8, 2025

(54) METHOD AND DEVICE FOR TRANSMITTING INFORMATION ON CLUSTER COMPRISING VULNERABLE ROAD USERS

(71) Applicant: LG ELECTRONICS INC., Seoul (KR)

(72) Inventors: Myoungseob Kim, Seoul (KR); Jaeho Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 343 days.

(21) Appl. No.: 17/909,201

(22) PCT Filed: Mar. 6, 2020

(86) PCT No.: PCT/KR2020/003170
§ 371 (c)(1),
(2) Date: Sep. 2, 2022

(87) PCT Pub. No.: WO2021/177492
PCT Pub. Date: Sep. 10, 2021

(65) Prior Publication Data
US 2023/0141179 A1    May 11, 2023

(51) Int. Cl.
*H04W 4/02* (2018.01)
*H04W 4/40* (2018.01)
*H04W 92/18* (2009.01)

(52) U.S. Cl.
CPC .............. *H04W 4/027* (2013.01); *H04W 4/40* (2018.02); *H04W 92/18* (2013.01)

(58) Field of Classification Search
None
See application file for complete search history.

(56) References Cited

U.S. PATENT DOCUMENTS

| | | | |
|---|---|---|---|
| 10,827,500 B2 * | 11/2020 | Chae | H04W 72/02 |
| 10,854,022 B2 * | 12/2020 | Patil | H04Q 9/00 |
| 2016/0212596 A1 * | 7/2016 | Brahmi | H04W 72/20 |
| 2018/0342154 A1 * | 11/2018 | Lee | H04W 4/70 |

FOREIGN PATENT DOCUMENTS

| | | |
|---|---|---|
| KR | 1020140054673 | 5/2014 |
| KR | 101729476 | 4/2017 |
| KR | 1020200015506 | 2/2020 |

* cited by examiner

*Primary Examiner* — Adolf Dsouza
(74) *Attorney, Agent, or Firm* — BRYAN CAVE LEIGHTON PAISNER LLP

(57) ABSTRACT

A method and apparatus for maintaining a VRU cluster is provided. The method comprises: estimating cluster parameters; and transmitting cluster information including the cluster parameters. The cluster parameters comprise at least one of the center position of the cluster and the velocity of the cluster. The center position of the cluster is determined on the basis of the position of a first terminal, and the velocity of the cluster is determined on the basis of the velocity of the first terminal.

15 Claims, 31 Drawing Sheets

(a)

(b)

(a)

(b)

(a)

(b)

(a)

(b)

(a)

(b)

METHOD AND DEVICE FOR TRANSMITTING INFORMATION ON CLUSTER COMPRISING VULNERABLE ROAD USERS

This application is the National Stage filing under 35 U.S.C. 371 of International Application No. PCT/KR2020/003170 filed on Mar. 6, 2020, the contents of which is hereby incorporated by reference herein in its entirety.

BACKGROUND OF THE DISCLOSURE

Field of the Disclosure

The present disclosure relates to wireless communication.

Related Art

V2X means communication between a terminal installed in a vehicle and other terminals, and the other terminals may be a pedestrian, a vehicle, and an infrastructure, and in this case, the other terminals may be sequentially called vehicle to pedestrian (V2P), vehicle to vehicle (V2V), vehicle to infrastructure (V2I), etc.

In V2X communication, data/control information may be transmitted and received through a sidelink defined in a D2D operation other than an uplink/downlink between a base station and the terminal used in conventional LTE communication.

SUMMARY

The present disclosure proposes a method for actively protecting the protected person through communication between devices or communication through infrastructure/network that is less sensitive to power consumption than general VRU devices and has excellent computational processing power when moving between VRUs composed of a guardian and a guardian.

According to the present disclosure, more resource-efficient communication can be performed by performing cluster-based communication, and VRU protection is easy.

An effect which can be obtained through one specific example of the present disclosure is not limited to effects listed above. For example, there can be various technical effects which a person having ordinary skill in the related art can appreciate and derive from the present disclosure. As a result, the specific effect of the present disclosure is not limited to an effect explicitly disclosed in the present disclosure, but may include various effects which can be appreciated or derived from a technical feature of the present disclosure.

DESCRIPTION OF EXEMPLARY EMBODIMENTS

Figure 1:
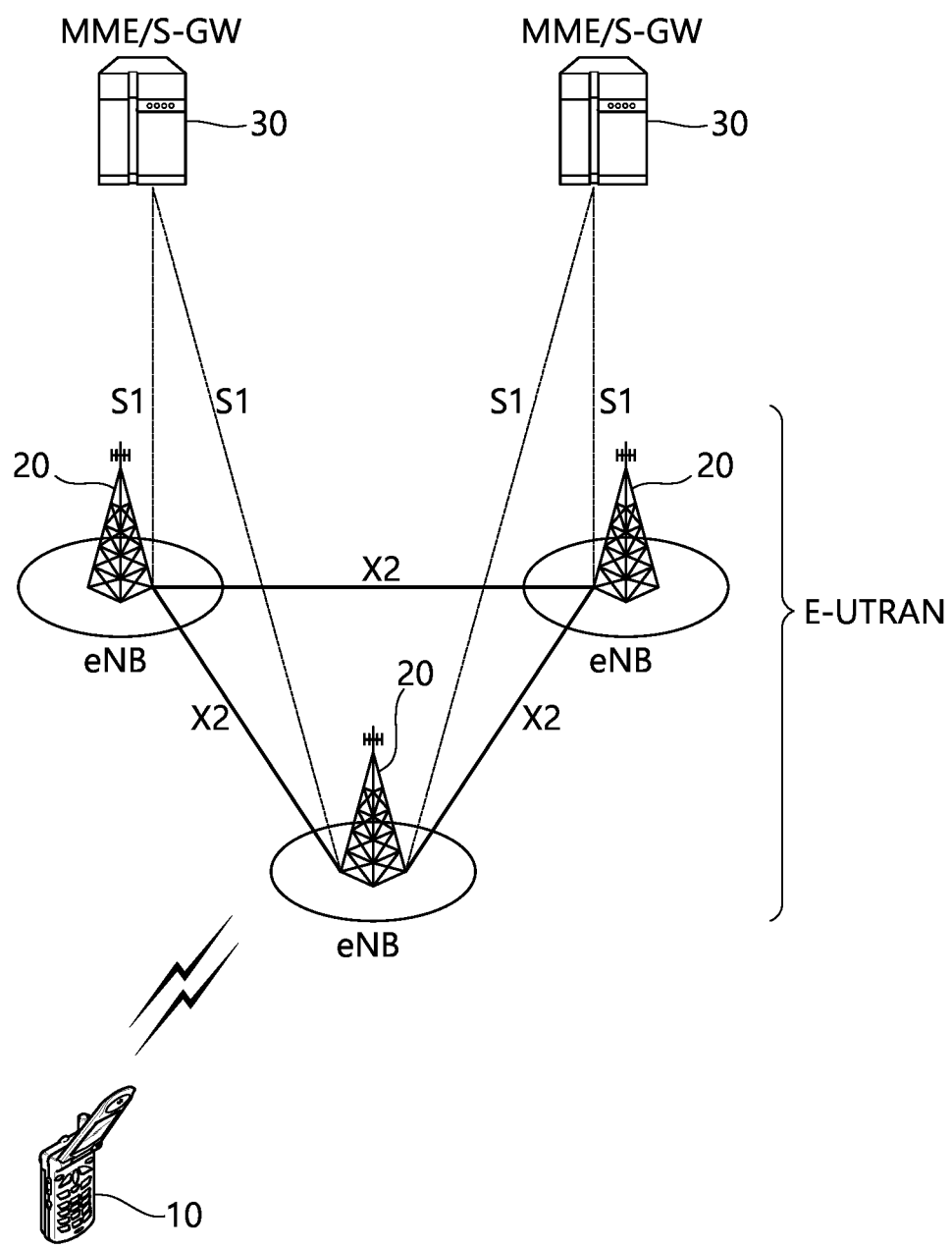
FIG. 1 shows a structure of an LTE system, in accordance with an embodiment of the present disclosure.

In the present disclosure, "A or B" may mean "only A", "only B" or "both A and B". When expressed separately, "A or B" may be interpreted as "A and/or B" in the present disclosure. For example, in the present disclosure, "A, B or C" may mean "only A", "only B", "only C", or "any combination of A, B and C".

A slash (/) or a comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B" or "both A and B". Also, in the present disclosure, the expression "at least one of A or B" or "at least one of A and/or B" may be interpreted the same as "at least one of A and B".

Also, in the present disclosure, "at least one of A, B and C" may mean "only A", "only B", "only C", or "any combination of A, B and C". Also, "at least one of A, B or C" or "at least one of A, B and/or C" may mean "at least one of A, B and C".

In addition, parentheses used in the present disclosure may mean "for example". Specifically, when "control information (PDCCH)" is indicated, "PDCCH" may be proposed as an example of "control information". When separately expressed, "control information" in the present disclosure may be not limited to "intra prediction", and "PDCCH" may be proposed as an example of "control information". Further, when "control information (i.e., PDCCH)" is indicated, "PDCCH" may be proposed as an example of "control information".

The following technology may be used for various wireless communication systems which include code division multiple access (CDMA), frequency division multiple access (FDMA), time division multiple access (TDMA), orthogonal frequency division multiple access (OFDMA), single carrier frequency division multiple access (SC-FDMA), non-orthogonal multiple access (NOMA), and the like. The CDMA may be implemented as radio technology such as Universal Terrestrial Radio Access (UTRA) or CDMA2000. The TDMA may be implemented as radio technology such as global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802, Evolved UTRA (E-UTRA), or the like. IEEE 802.16m as an evolution of IEEE 802.16e provides backward compatibility with a system based on IEEE 802.16e. The UTRA is part of Universal Mobile Telecommunications System (UMTS). 3rd Generation Partnership Project (3GPP) Long Term Evolution (LTE) as a part of Evolved UMTS (E-UMTS) using the E-UTRA (evolved-UMTS terrestrial radio access) adopts OFDMA in downlink and adopts SC-FDMA in uplink. LTE-Advanced (A) is evolution of LTE.

5G NR as subsequent technology is a new clean-slate type mobile communication system having features such as high performance, low latency, high availability, etc. 5G NR may utilize all available spectrum resources such as intermediate frequency band of 1 GHz to 10 GHz, a high-frequency (millimeter wave) band of 24 GHz or more, etc., from a low-frequency band less than 1 GHz.

For clear description, LTE-A or 5G NR is primarily described, but a technical spirit of the present disclosure is not limited thereto. The LTE-A or 5G NR may be referred to as an evolved-UMTS terrestrial radio access network (E-UTRAN) or long term evolution (LTE)/LTE-A system.

FIG. 1 shows a structure of an LTE system, in accordance with an embodiment of the present disclosure. This may also be referred to as an Evolved-UMTS Terrestrial Radio Access Network (E-UTRAN), or a Long Term Evolution (LTE)/LTE-A system.

Referring to FIG. 1, the E-UTRAN includes a base station (BS) 20, which provides a control plane and a user plane to a user equipment (UE) 10. The UE 10 may be fixed or mobile and may also be referred to by using different terms, such as Mobile Station (MS), User Terminal (UT), Subscriber Station (SS), Mobile Terminal (MT), wireless device, and so on. The base station 20 refers to a fixed station that communicated with the UE 10 and may also be referred to by using different terms, such as evolved-NodeB (eNB), Base Transceiver System (BTS), Access Point (AP), and so on.

The base stations 20 are interconnected to one another through an 23 interface. The base stations 20 are connected to an Evolved Packet Core (EPC) 30 through an S1 interface. More specifically, the base station 20 are connected to a Mobility Management Entity (MME) through an S1-MME interface and connected to Serving Gateway (S-GW) through an S1-U interface.

The EPC 30 is configured of an MME, an S-GW, and a Packet Data Network-Gateway (P-GW). The MME has UE access information or UE capability information, and such information may be primarily used in UE mobility management. The S-GW corresponds to a gateway having an E-UTRAN as its endpoint. And, the P-GW corresponds to a gateway having a Packet Data Network (PDN) as its endpoint.

Layers of a radio interface protocol between the UE and the network may be classified into a first layer (L1), a second layer (L2), and a third layer (L3) based on the lower three layers of an open system interconnection (OSI) model, which is well-known in the communication system. Herein, a physical layer belonging to the first layer provides a physical channel using an Information Transfer Service, and a Radio Resource Control (RRC) layer, which is located in the third layer, executes a function of controlling radio resources between the UE and the network. For this, the RRC layer exchanges RRC messages between the UE and the base station.

Figure 2:
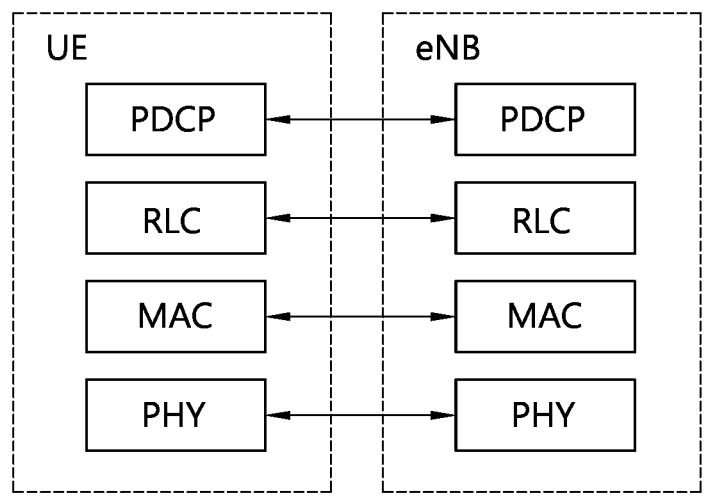
FIG. 2 shows a radio protocol architecture of a user plane, in accordance with an embodiment of the present disclosure.
Figure 3:
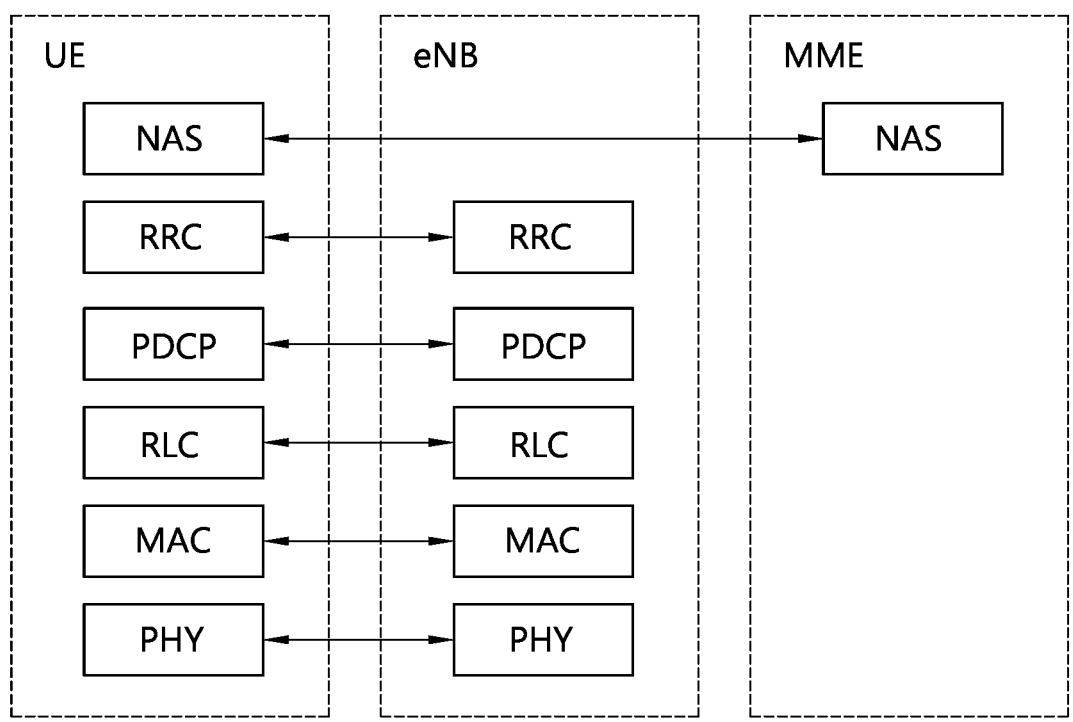
FIG. 3 shows a radio protocol architecture of a control plane, in accordance with an embodiment of the present disclosure.

FIG. 2 shows a radio protocol architecture of a user plane, in accordance with an embodiment of the present disclosure. FIG. 3 shows a radio protocol architecture of a control plane, in accordance with an embodiment of the present disclosure. The user plane corresponds to a protocol stack for user data transmission, and the control plane corresponds to a protocol stack for control signal transmission.

Referring to FIG. 2 and FIG. 3, a physical (PHY) layer belongs to the L1. A physical (PHY) layer provides an information transfer service to a higher layer through a physical channel. The PHY layer is connected to a medium access control (MAC) layer. Data is transferred (or transported) between the MAC layer and the PHY layer through a transport channel. The transport channel is sorted (or categorized) depending upon how and according to which characteristics data is being transferred through the radio interface.

Between different PHY layers, i.e., a PHY layer of a transmitter and a PHY layer of a receiver, data is transferred through the physical channel. The physical channel may be modulated by using an orthogonal frequency division multiplexing (OFDM) scheme and uses time and frequency as radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

The radio resource control (RRC) layer is defined only in a control plane. And, the RRC layer performs a function of controlling logical channel, transport channels, and physical channels in relation with configuration, re-configuration, and release of radio bearers. The RB refers to a logical path being provided by the first layer (physical layer or PHY layer) and the second layer (MAC layer, RLC layer, Packet Data Convergence Protocol (PDCP) layer) in order to transport data between the UE and the network.

Functions of a PDCP layer in the user plane include transfer, header compression, and ciphering of user data. Functions of a PDCP layer in the control plane include transfer and ciphering/integrity protection of control plane data.

The configuration of the RB refers to a process for specifying a radio protocol layer and channel properties in order to provide a particular service and for determining respective detailed parameters and operation methods. The RB may then be classified into two types, i.e., a signaling radio bearer (SRB) and a data radio bearer (DRB). The SRB is used as a path for transmitting an RRC message in the control plane, and the DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the base station is released.

Downlink transport channels transmitting (or transporting) data from a network to a UE include a Broadcast Channel (BCH) transmitting system information and a downlink Shared Channel (SCH) transmitting other user traffic or control messages. Traffic or control messages of downlink multicast or broadcast services may be transmitted via the downlink SCH or may be transmitted via a separate downlink Multicast Channel (MCH). Meanwhile, uplink transport channels transmitting (or transporting) data from a UE to a network include a Random Access Channel (RACH) transmitting initial control messages and an uplink Shared Channel (SCH) transmitting other user traffic or control messages.

Logical channels existing at a higher level than the transmission channel and being mapped to the transmission channel may include a Broadcast Control Channel (BCCH), a Paging Control Channel (PCCH), a Common Control Channel (CCCH), a Multicast Control Channel (MCCH), a Multicast Traffic Channel (MTCH), and so on.

A physical channel is configured of a plurality of OFDM symbols in the time domain and a plurality of sub-carriers in the frequency domain. One subframe is configured of a plurality of OFDM symbols in the time domain. A resource block is configured of a plurality of OFDM symbols and a plurality of sub-carriers in resource allocation units. Additionally, each subframe may use specific sub-carriers of specific OFDM symbols (e.g., first OFDM symbol) of the corresponding subframe for a Physical Downlink Control Channel (PDCCH), i.e., L1/L2 control channels. A Transmission Time Interval (TTI) refers to a unit time of a subframe transmission.

Figure 4:
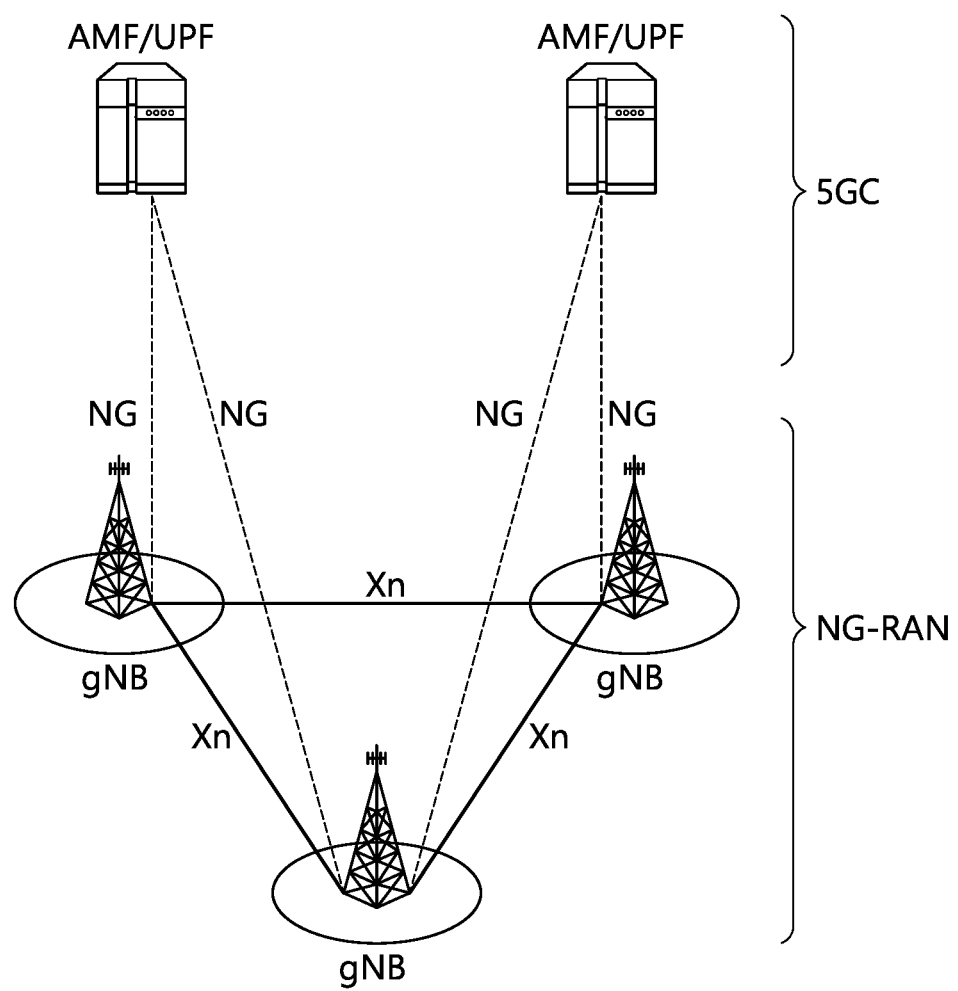
FIG. 4 shows a structure of an NR system, in accordance with an embodiment of the present disclosure.

FIG. 4 shows a structure of an NR system, in accordance with an embodiment of the present disclosure.

Referring to FIG. 4, a Next Generation-Radio Access Network (NG-RAN) may include a next generation-Node B (gNB) and/or eNB providing a user plane and control plane protocol termination to a user. FIG. 4 shows a case where the NG-RAN includes only the gNB. The gNB and the eNB are connected to one another via Xn interface. The gNB and the eNB are connected to one another via 5th Generation (5G) Core Network (5GC) and NG interface. More specifically, the gNB and the eNB are connected to an access and mobility management function (AMF) via NG-C interface, and the gNB and the eNB are connected to a user plane function (UPF) via NG-U interface.

Figure 5:
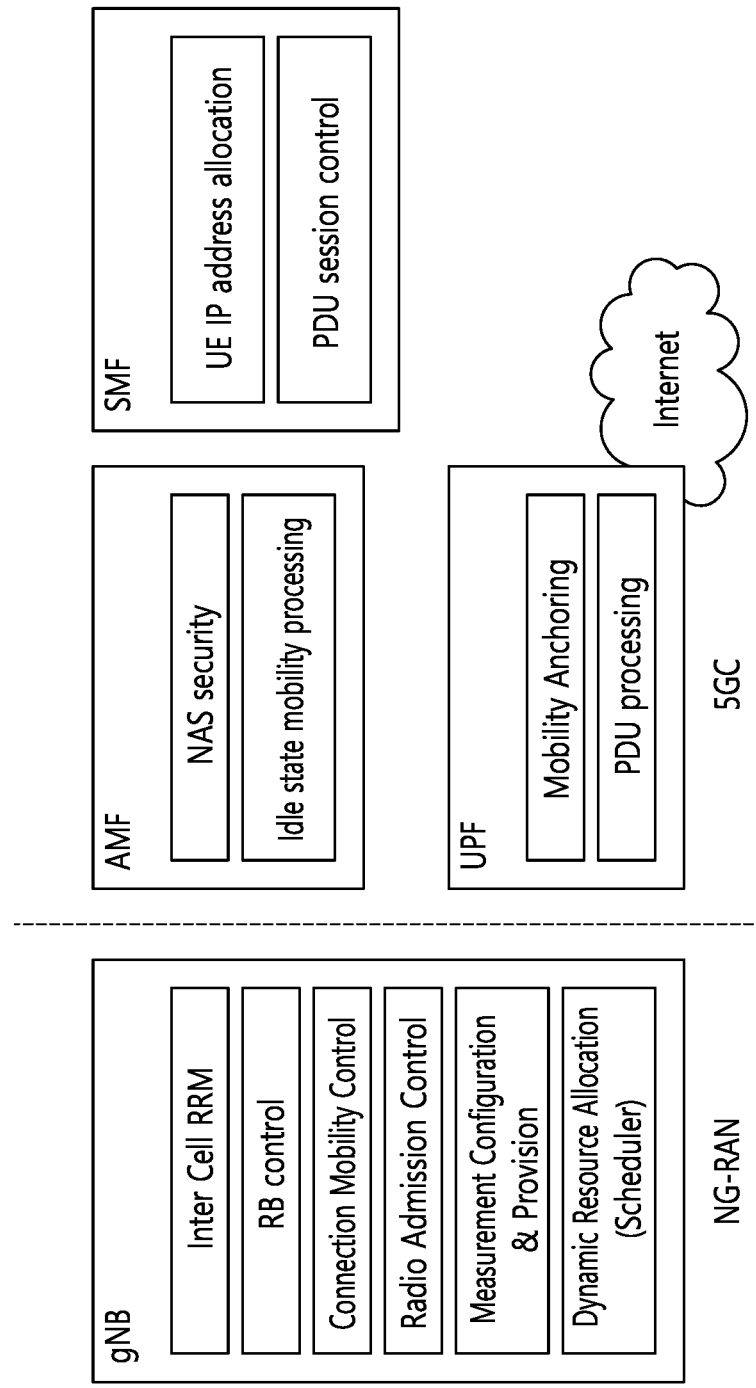
FIG. 5 shows a functional division between an NG-RAN and a 5GC, in accordance with an embodiment of the present disclosure.

FIG. 5 shows a functional division between an NG-RAN and a 5GC, in accordance with an embodiment of the present disclosure.

Referring to FIG. 5, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Figure 6:
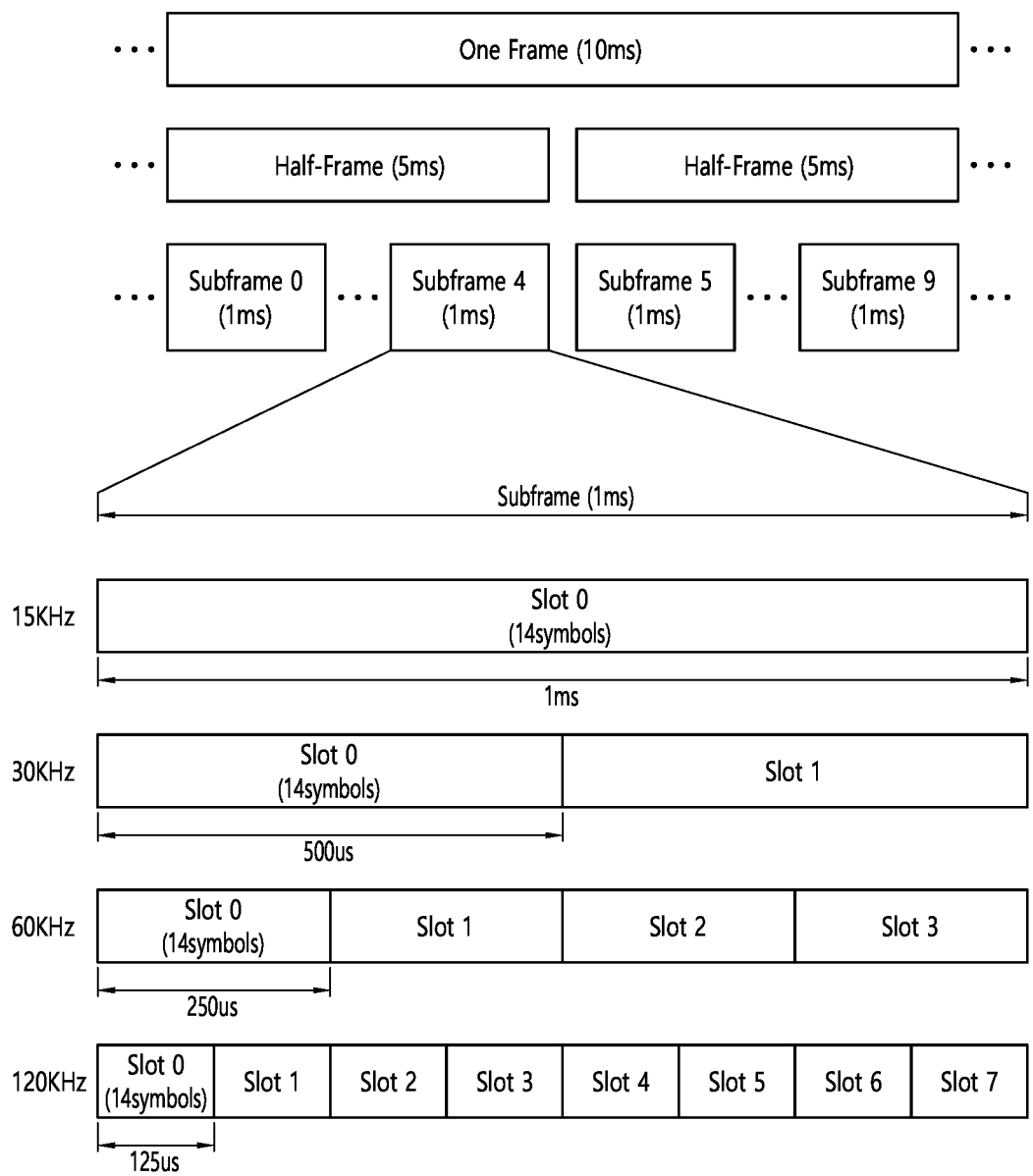
FIG. 6 shows a structure of a radio frame of an NR, in accordance with an embodiment of the present disclosure.

FIG. 6 shows a structure of a radio frame of an NR, in accordance with an embodiment of the present disclosure.

Referring to FIG. 6, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) in accordance with an SCS configuration (u), in a case where a normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |

TABLE 1-continued

| SCS (15*2$^u$) | $N^{slot}_{symb}$ | $N^{frame, u}_{slot}$ | $N^{subframe, u}_{slot}$ |
|---|---|---|---|
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS (15*2$^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 7:
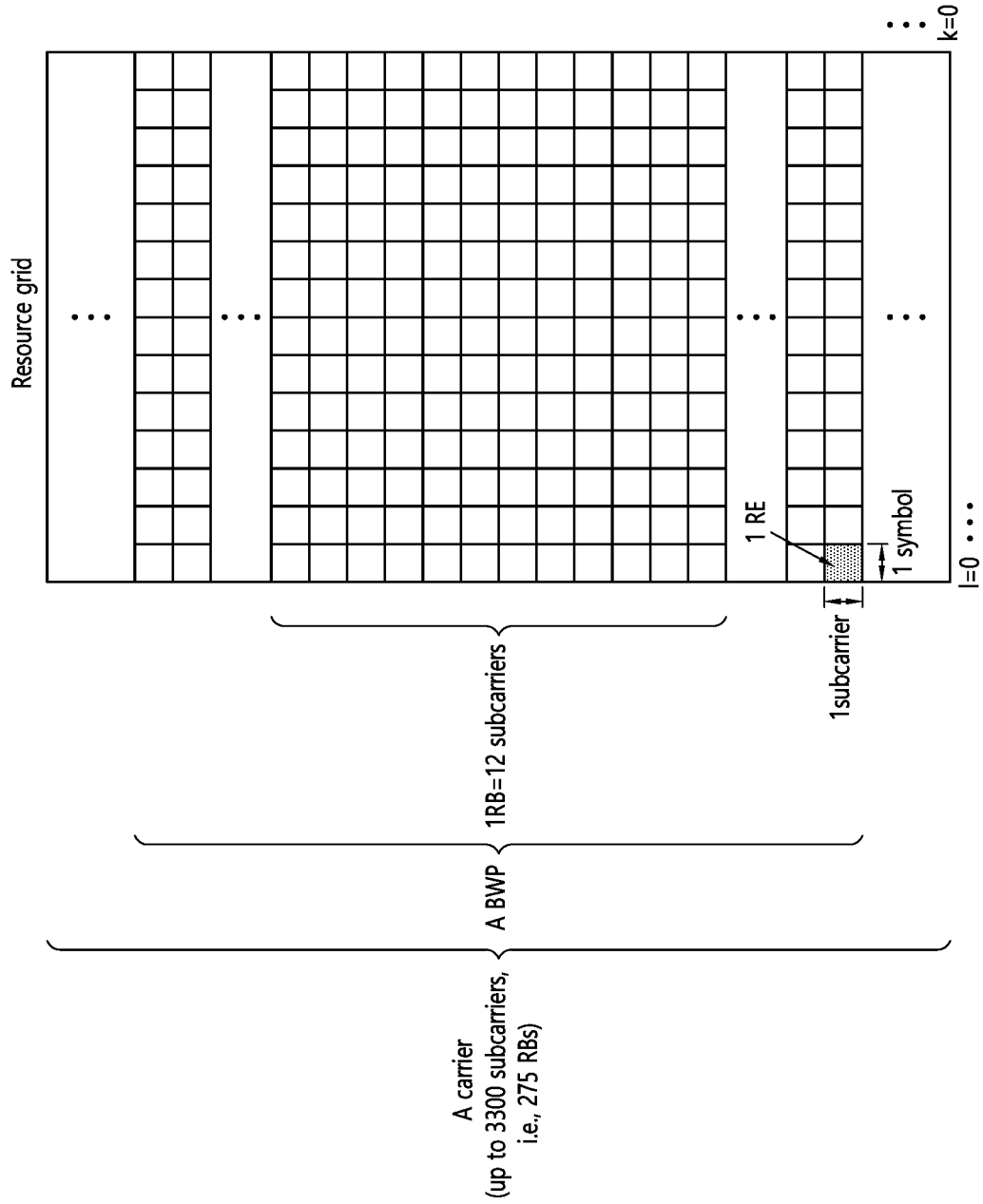
FIG. 7 shows a structure of a slot of an NR frame, in accordance with an embodiment of the present disclosure.

FIG. 7 shows a structure of a slot of an NR frame, in accordance with an embodiment of the present disclosure.

Referring to FIG. 7, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the location of the bandwidth may move in a frequency domain. For example, the location of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be referred to as a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit PUCCH or PUSCH outside an active UL BWP. For example, in a downlink case, the initial BWP may be given as a consecutive RB set for an RMSI CORESET (configured by PBCH). For example, in an uplink case, the initial BWP may be given by SIB for a random access procedure. For example, the default BWP may be configured by a higher layer. For example, an initial value of the default BWP may be an initial DL BWP. For energy saving, if the UE fails to detect DCI during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 8:
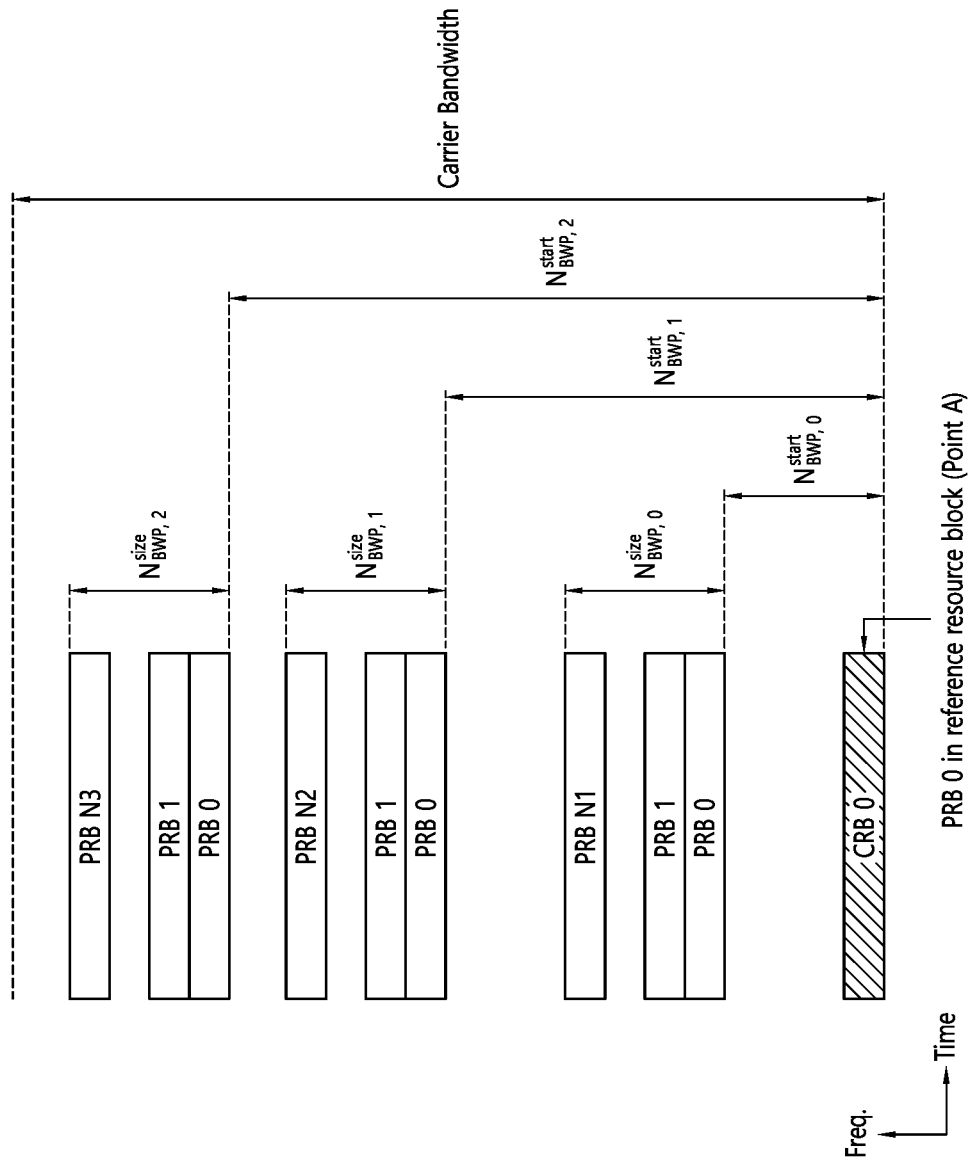
FIG. 8 shows a BWP based on an embodiment of the present disclosure.

FIG. 8 shows a BWP based on an embodiment of the present disclosure. It is assumed in the embodiment of FIG. 8 that the number of BWPs is 3.

Referring to FIG. 8, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

Figure 9:
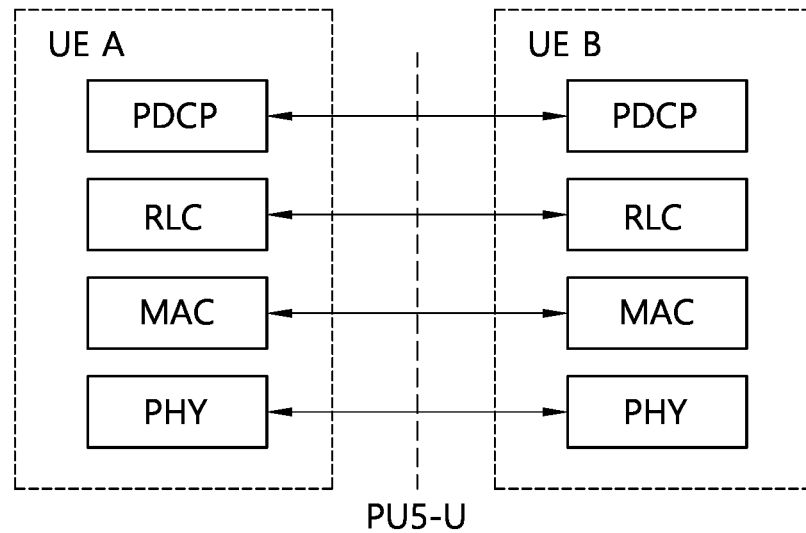
FIG. 9 shows a radio protocol architecture for a SL communication, in accordance with an embodiment of the present disclosure.
Figure 9:
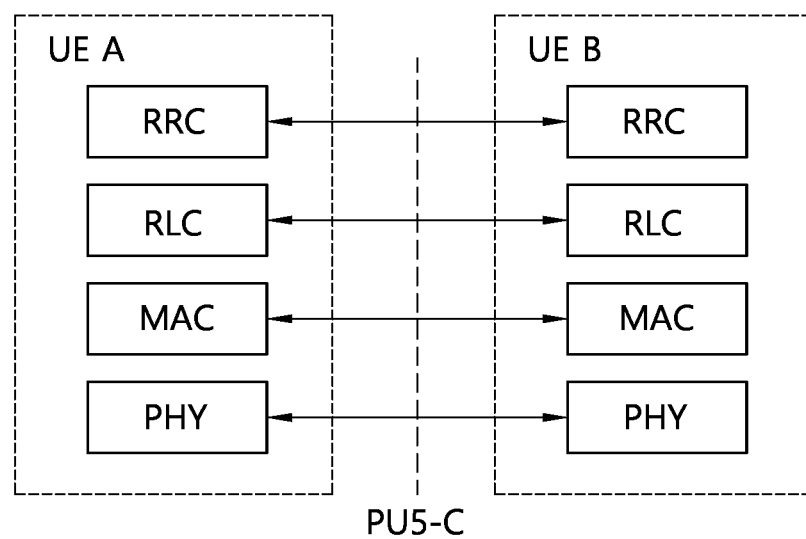

FIG. 9 shows a radio protocol architecture for a SL communication, in accordance with an embodiment of the present disclosure. The embodiment of FIG. 9 may be combined with various embodiments of the present disclosure. More specifically, (a) of FIG. 9 shows a user plane protocol stack of LTE, and (b) of FIG. 9 shows a control plane protocol stack of LTE.

Figure 10:
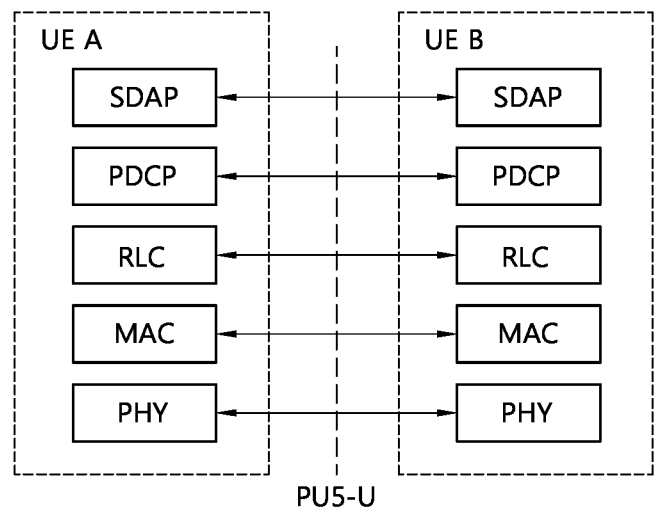
FIG. 10 shows a radio protocol architecture for a SL communication, in accordance with an embodiment of the present disclosure.
Figure 10:
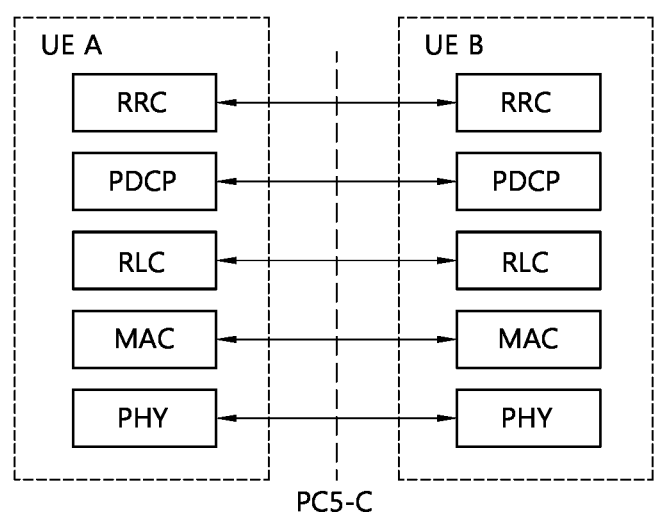

FIG. 10 shows a radio protocol architecture for a SL communication, in accordance with an embodiment of the present disclosure. The embodiment of FIG. 10 may be combined with various embodiments of the present disclosure. More specifically, (a) of FIG. 10 shows a user plane protocol stack of NR, and (b) of FIG. 10 shows a control plane protocol stack of NR.

Hereinafter, a Sidelink Synchronization Signal (SLSS) and synchronization information will be described in detail.

The SLSS is a sidelink specific sequence, which may include a Primary Sidelink Synchronization Signal (PSSS) and a Secondary Sidelink Synchronization Signal (SSSS). The PSSS may be referred to as Sidelink Primary Synchronization Signal (S-PSS) and the SSSS may be referred to as Sidelink Secondary Synchronization Signal (S-SSS).

A Physical Sidelink Broadcast Channel (PSBCH) may refer to a (broadcast) channel through which (system) information, which consist of default (or basic) information that should first be known by the UE before the sidelink signal transmission/reception. For example, the default (or basic) information may be information related to the SLSS, a Duplex Mode (DM), TDD UL/DL configuration, information related to resource pools, types of applications related to the SLSS, a subframe offset, broadcast information, and so on.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. In addition, a frequency position of the S-SSB may be (pre-)configured. Accordingly, the UE does not need to perform hypothesis detection at frequency to discover the S-SSB in the carrier.

Each SLSS may have a physical layer sidelink synchronization identity (ID), and the values may be respectively equal to any one value ranging from 0 to 335. Depending upon any one of the above-described values that is used, a synchronization source may also be identified. For example, values of 0, 168, 169 may indicate the GNSS, values from 1 to 167 may indicate base stations, and values from 170 to 335 may indicate that the source is outside of the coverage. Alternatively, among the physical layer sidelink synchronization ID values, values 0 to 167 may be values being used by a network, and values from 168 to 335 may be values being used outside of the network coverage.

Figure 11:
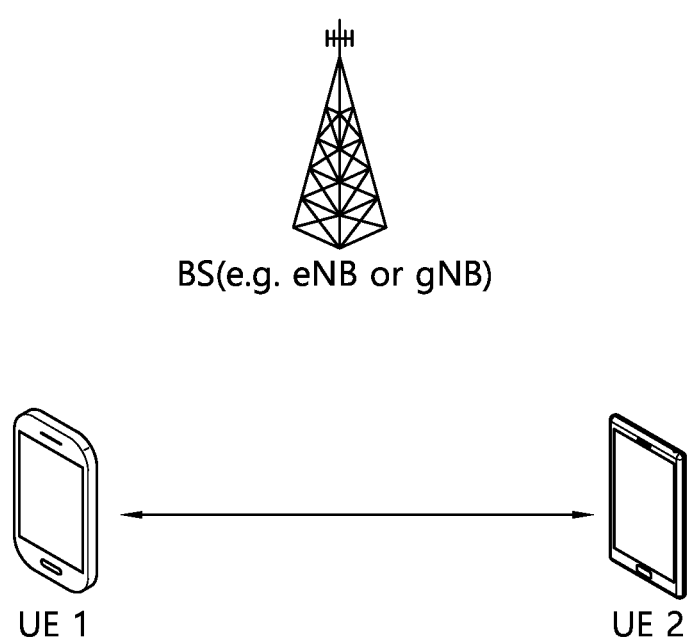
FIG. 11 shows a UE performing V2X or SL communication in accordance with an embodiment of the present disclosure.

FIG. 11 shows a UE performing V2X or SL communication in accordance with an embodiment of the present disclosure.

Referring to FIG. 11, in V2X or SL communication, the term 'UE' may generally imply a UE of a user. However, if a network equipment such as a BS transmits/receives a signal based on a communication scheme between UEs, the BS may also be regarded as a sort of the UE.

For example, the UE 1 may select a resource unit corresponding to a specific resource in a resource pool which implies a set of series of resources. In addition, the UE 1 may transmit an SL signal by using the resource unit. For example, the UE 2 which is a receiving UE may be allocated with a resource pool in which the UE 1 is capable of transmitting a signal, and may detect a signal of the UE 1 in the resource pool.

Herein, if the UE 1 is within a coverage of the BS, the BS may inform the UE 1 of the resource pool. Otherwise, if the UE 1 is out of the coverage of the BS, another UE may inform the UE 1 of the resource pool, or the UE 1 may use a pre-configured resource pool.

In general, the resource pool may be configured based on a plurality of resource units, and each UE may select at least one resource unit for SL signal transmission.

Figure 12:
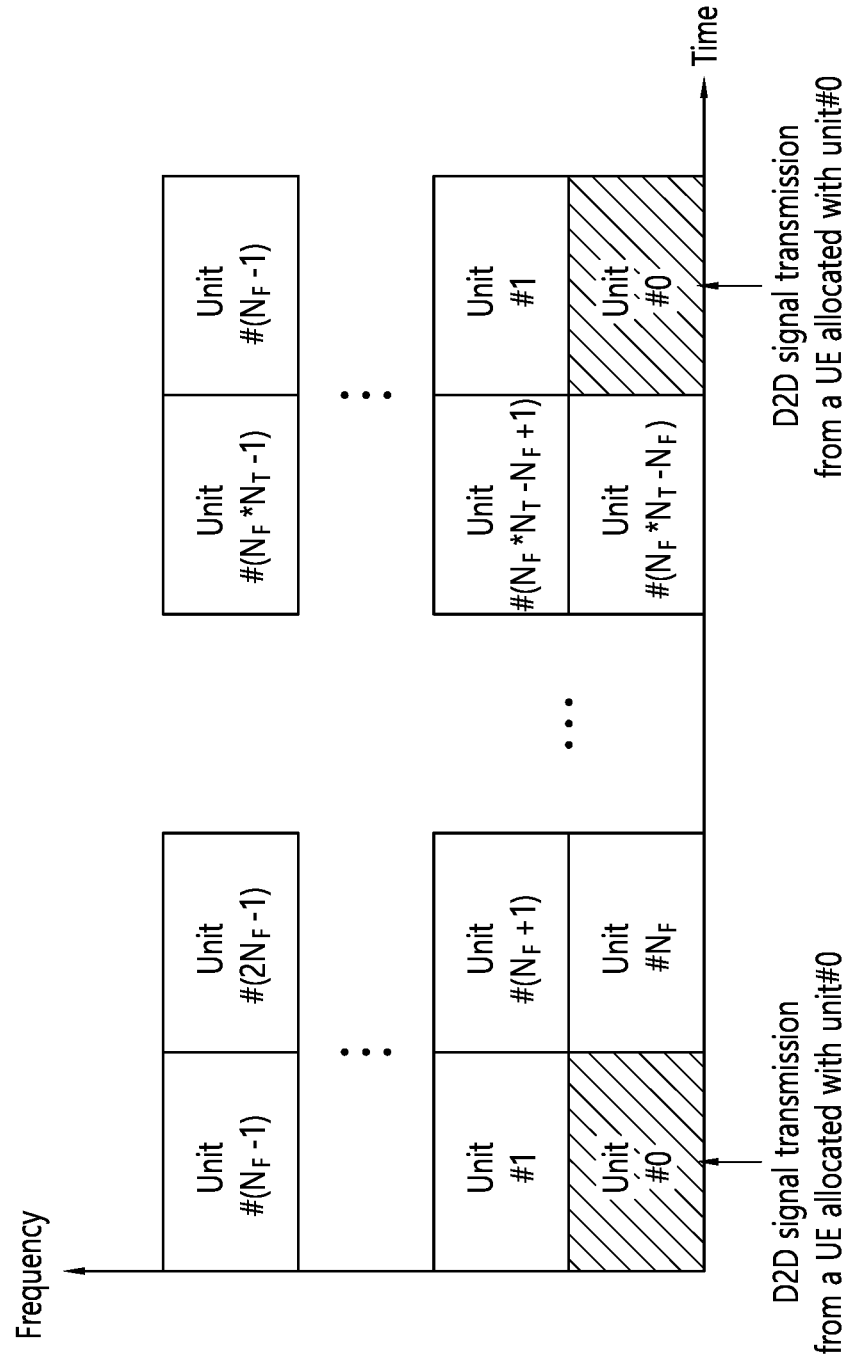
FIG. 12 shows a resource unit for V2X or SL communication based on an embodiment of the present disclosure.

FIG. 12 shows a resource unit for V2X or SL communication based on an embodiment of the present disclosure.

Referring to FIG. 12, all frequency resources of a resource pool may be divided into $N_F$ resources, and all time resources of the resource pool may be divided into $N_T$ resources. Therefore, $N_F*N_T$ resource units may be defined in the resource pool. FIG. A12 may show an example of a case where a corresponding resource pool is repeated with a period of $N_T$ subframes.

As shown in FIG. 12, one resource unit (e.g., Unit #0) may be periodically repeated. Alternatively, to obtain a diversity effect in a time or frequency domain, an index of a physical resource unit to which one logical resource unit is mapped may change to a pre-determined pattern over time. In a structure of such a resource unit, the resource pool may imply a set of resource units that can be used in transmission by a UE intending to transmit an SL signal.

The resource pool may be subdivided into several types. For example, based on content of an SL signal transmitted in each resource pool, the resource pool may be classified as follows.

(1) Scheduling assignment (SA) may be a signal including information related to a location of a resource used for transmission of an SL data channel by a transmitting UE, a modulation and coding scheme (MCS) or multiple input multiple output (MIMO) transmission scheme required for demodulation of other data channels, timing advance (TA), or the like. The SA can be transmitted by being multiplexed together with SL data on the same resource unit. In this case, an SA resource pool may imply a resource pool in which SA is transmitted by being multiplexed with SL data. The SA may also be referred to as an SL control channel (2) An SL data channel (physical sidelink shared channel (PSSCH)) may be a resource pool used by the transmitting UE to transmit user data. If SA is transmitted by being multiplexed together with SL data on the same resource unit, only an SL data channel of a type except for SA information may be transmitted in the resource pool for the SL data channel. In other words, resource elements (REs) used to transmit SA information on an individual resource unit in the SA resource pool may be used to transmit SL data still in the resource pool of the SL data channel. For example, the transmitting UE may transmit the PSSCH by mapping it to consecutive PRBs.

(3) A discovery channel may be a resource pool for transmitting, by the transmitting UE, information related to an ID thereof, or the like. Accordingly, the transmitting UE may allow an adjacent UE to discover the transmitting UE itself.

Even if the aforementioned SL signals have the same content, different resource pools may be used based on a transmission/reception attribute of the SL signals. For example, even the same SL data channel or discovery message may be classified again into different resource pools based on a scheme of determining SL signal transmission timing (e.g., whether it is transmitted at a reception time of a synchronization reference signal or transmitted by applying a specific timing advance at the reception time), a resource allocation scheme (e.g., whether a BS designates a transmission resource of an individual signal to an individual transmitting UE or whether the individual transmitting UE autonomously selects an individual signal transmission resource in a resource pool), a signal format (e.g., the number of symbols occupied by each SL signal or the number of subframes used in transmission of one SL signal), signal strength from the BS, transmit power strength of an SL UE, or the like.

Hereinafter, a resource allocation in sidelink will be described.

Figure 13:
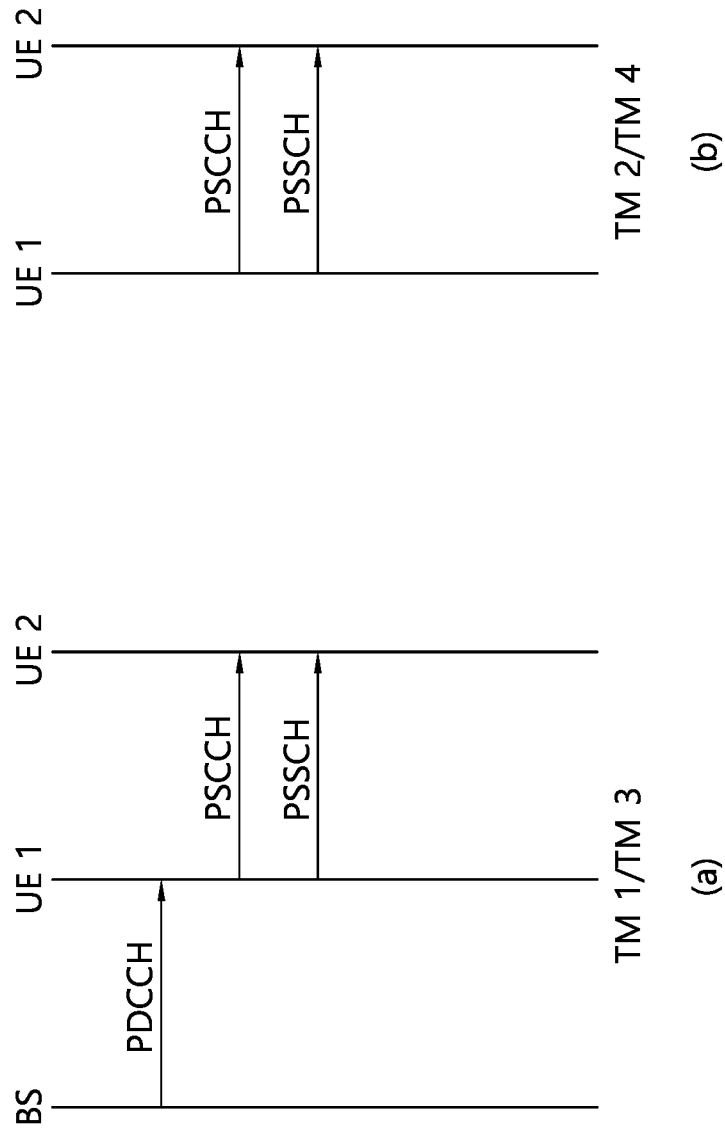
FIG. 13 shows exemplary UE operations according to a transmission mode (TM) related to V2X/D2D in accordance with an embodiment of the present disclosure.

FIG. 13 shows exemplary UE operations according to a transmission mode (TM) related to V2X/D2D in accordance with an embodiment of the present disclosure. (a) of FIG. 13 shows UE operations related to Transmission mode 1 or Transmission mode 3, and (b) of FIG. 13 shows UE operations related to Transmission mode 2 or Transmission mode 4.

Referring to (a) of FIG. 13, in Transmission modes 1/3, the base station performs resource scheduling to UE 1 through a PDCCH (more specifically, DCI), and UE 1 performs sidelink/V2X communication with UE 2 in accordance with the corresponding resource scheduling. After transmitting sidelink control information (SCI) to UE 2 through a physical sidelink control channel (PSCCH), UE 1 may transmit data that is based on the SCI through a physical sidelink shared channel (PSSCH). Transmission mode 1 may be applied to sidelink, and Transmission mode 3 may be applied to V2X.

Referring to (b) of FIG. 13, in Transmission modes 2/4 may be modes according to which the UE performs self-scheduling. More specifically, Transmission mode 2 may be applied to sidelink, wherein the UE may select a resource by itself from a configured resource pool and perform sidelink operations. Transmission mode 4 may be applied to V2X, wherein, after performing sensing/SA decoding processes, and so on, the UE may select a resource by itself from a selection window and may then perform V2X operations. After transmitting SCI to UE 2, UE 1 may transmit data that is based on the SCI through the PSSCH. Hereinafter, the term Transmission mode may be abbreviated as Mode.

In case of NR sidelink, at least two types of sidelink resource allocation modes may be defined. In case of Mode 1, the base station may schedule sidelink resources that are to be used for sidelink transmission. In case of Mode 2, the user equipment (UE) may determine a sidelink transmission resource from sidelink resources that are configured by the base station/network or predetermined sidelink resources. The configured sidelink resources or the predetermined sidelink resources may be a resource pool. For example, in case of Mode 2, the UE may autonomously select a sidelink resource for transmission. For example, in case of Mode 2, the UE may assist (or help) sidelink resource selection of another UE. For example, in case of Mode 2, the UE may be configured with an NR configured grant for sidelink transmission. For example, in case of Mode 2, the UE may schedule sidelink transmission of another UE. And, Mode 2 may at least support reservation of sidelink resources for blind retransmission.

Procedures related to sensing and resource (re-)selection may be supported in Resource Allocation Mode 2. The sensing procedure may be defined as a process decoding the SCI from another UE and/or sidelink measurement. The decoding of the SCI in the sensing procedure may at least provide information on a sidelink resource that is being indicated by a UE transmitting the SCI. When the corresponding SCI is decoded, the sensing procedure may use L1 SL Reference Signal Received Power (RSRP) measurement, which is based on a Demodulation Reference Signal (SL DMRS). The resource (re-)selection procedure may use a result of the sensing procedure in order to determine the resource for the sidelink transmission.

Figure 14:
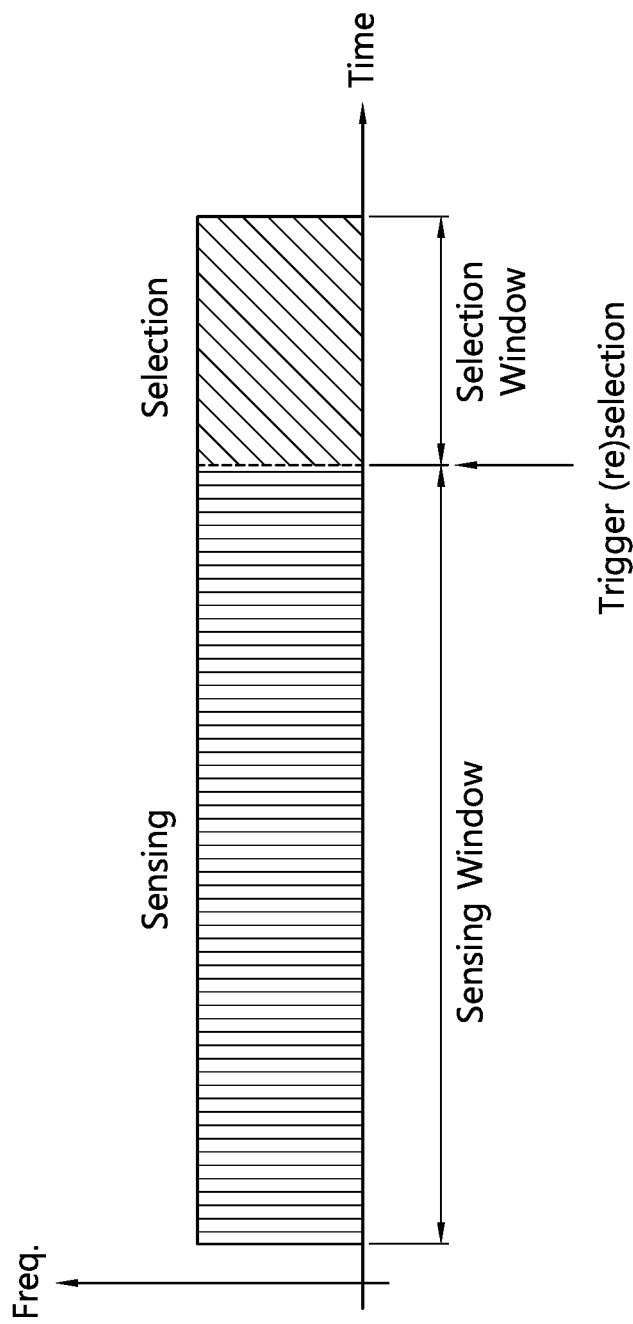
FIG. 14 shows an example of a selection of transmission resources in accordance with an embodiment of the present disclosure.

FIG. 14 shows an example of a selection of transmission resources in accordance with an embodiment of the present disclosure.

Referring to FIG. 14, by performing sensing within a sensing window, the UE may determine transmission resources reserved by another UE or transmission resources being used by another UE, and, after such transmission resources are excluded from the selection window, among the remaining resources, the UE may randomly select resources from resources having little interference.

For example, within the sensing window, the UE may decode the PSCCH including information on the cycle periods of the reserved resources and may measure PSCCH RSRP from the periodically determined resources based on the PSCCH. The UE may exclude resources having the PSSCH RSRP that exceeds a threshold value from the selection window. Thereafter, the UE may randomly select sidelink resources from the remaining resources within the selection window.

Alternatively, the UE may measure Received signal strength indication (RSSI) of the periodic resources within the sensing window, so as to determine resources having little interference (e.g., resources corresponding to the lower 20%). And, among the periodic resources, the UE may randomly select sidelink resources from the resources included in the selection window. For example, in case the UE fails to perform decoding of the PSCCH, the UE may use the above-described method.

Hereinafter, a hybrid automatic repeat request (HARQ) procedure will be described.

An error compensation scheme for securing communication reliability may include a Forward Error Correction (FEC) scheme and an Automatic Repeat Request (ARQ) scheme. In the FEC scheme, errors in a receiving end are corrected by attaching an extra error correction code to information bits. The FEC scheme has an advantage in that time delay is small and no information is additionally exchanged between a transmitting end and the receiving end but also has a disadvantage in that system efficiency deteriorates in a good channel environment. The ARQ scheme has an advantage in that transmission reliability can be increased but also has a disadvantage in that a time delay occurs and system efficiency deteriorates in a poor channel environment.

A hybrid automatic repeat request (HARQ) scheme is a combination of the FEC scheme and the ARQ scheme and it is determined whether an unrecoverable error is included in data received by a physical layer, and retransmission is requested upon detecting the error, thereby improving performance.

In case of SL unicast and groupcast, HARQ feedback and HARQ combining in the physical layer may be supported. For example, when a receiving UE operates in a resource allocation mode 1 or 2, the receiving UE may receive the PSSCH from a transmitting UE, and the receiving UE may transmit HARQ feedback for the PSSCH to the transmitting UE by using a sidelink feedback control information (SFCI) format through a physical sidelink feedback channel (PSFCH).

When the SL HARQ feedback may be enabled for unicast, in a non-code block group (non-CBG) operation, if the receiving UE successfully decodes a transport block, the receiving UE may generate HARQ-ACK. In addition, the receiving UE may transmit the HARQ-ACK to the transmitting UE. If the receiving UE cannot successfully decode the transport block after decoding the PSCCH of which the target is the receiving UE, the receiving UE may generate the HARQ-NACK. In addition, the receiving UE may transmit HARQ-NACK to the transmitting UE.

When the SL HARQ feedback may be enabled for groupcast, the UE may determine whether to transmit HARQ feedback based on a transmission-reception (TX-RX) distance and/or RSRP. In the non-CBG operation, two HARQ feedback options may be supported for groupcast.

(1) Option 1: After the receiving UE decodes an associated PSCCH, if the receiving UE fails to decode the corresponding transport block, the receiving UE may transmit an HARQ-NACK over the PSFCH. Otherwise, the receiving UE may not transmit a signal on the PSFCH.

(2) Option 2: If the receiving UE successfully decodes the corresponding transport block, the receiving UE may transmit an HARQ-NACK on the PSFCH. After the receiving UE decodes an associated PSCCH targeting the receiving UE, if the receiving UE fails to successfully decode the corresponding transport block, the receiving UE may transmit an HARQ-NACK on the PSFCH.

In case of Resource Allocation Mode 1, a time between the HARQ feedback transmission on the PSFCH and the PSSCH may be (pre-)configured. In case of unicast and groupcast, if retransmission is needed in the sidelink, this may be indicated, to the base station, by a UE existing within a coverage using a PUCCH. The transmitting UR may also transmit an indication to a service base station of the transmitting UE in the form of a Scheduling Request (SR)/Buffer Status Report (BSR) and not in the form of an HARQ ACK/NACK. Additionally, even if the base station does not receive the indication, the base station may schedule a sidelink retransmission resource to the UE.

In case of Resource Allocation Mode 2, a time between the HARQ feedback transmission on the PSFCH and the PSSCH may be (pre-)configured.

Hereinafter, the proposals of the present disclosure will be described in more detail.

The following drawings are prepared for describing one specific example of the present disclosure. A name of a specific device or a name of a specific signal/message/field disclosed in the drawings is exemplarily presented, so a technical feature of the present disclosure is not limited to a specific name used in the following drawings.

The present disclosure proposes a method for estimating information of a cluster representing VRUs when moving by clustering between vulnerable road users (VRUs). Here, the cluster may refer to a group in which VRUs are connected to each other and operate as one system or one terminal. Also, clustering may refer to an act of creating/forming the cluster.

Figure 15:
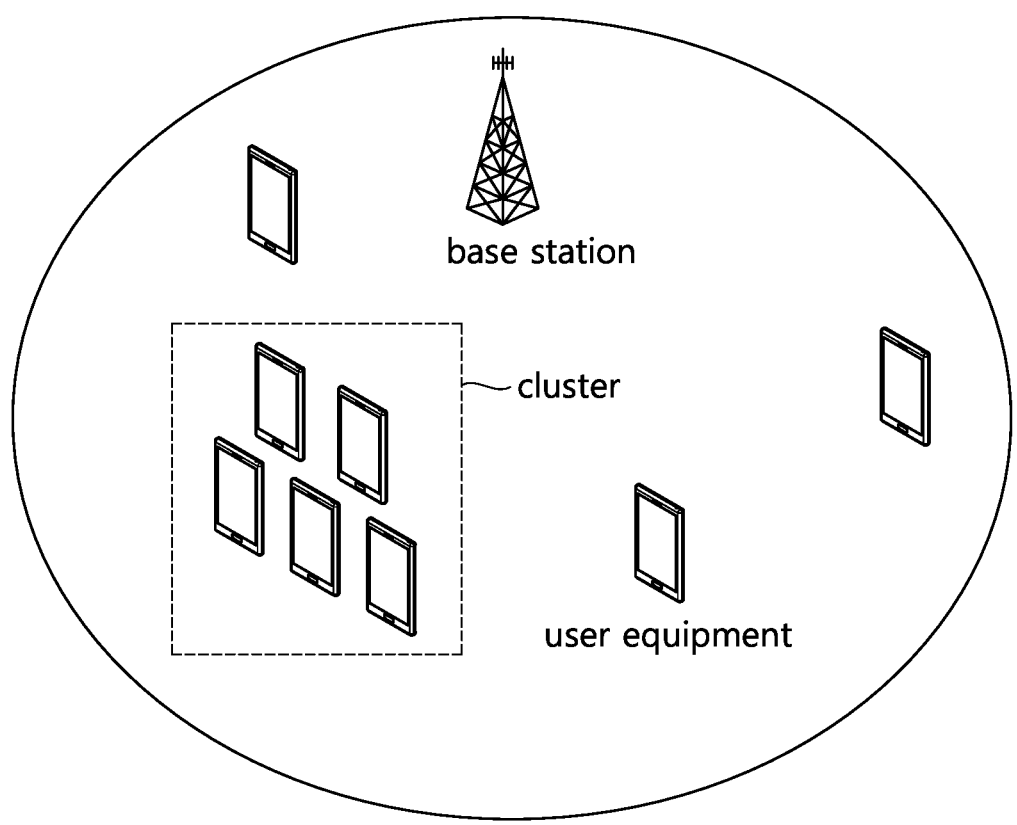
FIG. 15 is for explaining a cluster.

FIG. 15 is for explaining a cluster.

FIG. 15 is an assumption that a plurality of terminals exist within the coverage of the base station. Referring to FIG. 15, some terminals among a plurality of terminals within coverage may be clustered to configure one cluster. As a condition of cluster configuration, a similar level of movement velocity, movement direction, etc. can be considered. Meanwhile, in this specification, velocity may be a concept including speed and movement direction.

Meanwhile, although FIG. 15 shows only clusters within the coverage of the base station, this is only an example, and clusters may be created between terminals belonging to different coverages. Also, here, each of the terminals constituting the cluster may be a terminal that satisfies a configuration condition. For example, the movement velocity of each of the terminals constituting the cluster may be similar and may not exceed a velocity-related threshold. For example, the difference between the velocity of each of the terminals constituting the cluster and the average velocity of the cluster may be less than or equal to the velocity threshold. Here, velocity is a vector value including speed and direction, and the velocity threshold may include a speed threshold and a direction threshold. In addition, each of the terminals constituting the cluster may be a terminal located within a predetermined distance from the center of the cluster.

The method proposed in the present disclosure includes P2P (pedestrian-to-pedestrian) communication method for sharing a safety message, etc. between pedestrian terminals, I2P (infrastructure-to-pedestrian) communication method for receiving VRU protection information, etc. from surrounding infrastructure/network, etc., and Network-to-pedestrian (N2P) communication method. For being transmitted to nearby vehicles as well as to oncoming vehicles and/or vehicles in their blind spot, messages transmitted by the VRUs may be collected by pedestrian-to-infrastructure (P2I) communication, pedestrian-to-network (P2N) communication, or the like from an infrastructure/network or the like. A specific VRU may transmit a safety message for its own information or transmit information on a cluster including itself. For example, the information on the cluster may inform the number of VRUs constituting the cluster and/or the number of VRUs leaving the cluster, the velocity of the cluster, the location of the cluster, the movement direction of the cluster, and the like. Meanwhile, the information may be transmitted through a basic message of a Personal Safety Message (PSM) or an extended message of the PSM.

VRU can be vulnerable to traffic accidents, injuries, etc. compared to general vehicles on the road, and it refers to those who have low mobility or velocity. Because VRUs occupy less area and volume than vehicles, they can stop or move at a much higher density than vehicles in VRU-dense areas.

In this situation, when all VRUs transmit a safety message indicating their information, since the collision and interference of radio resources becomes very severe, messages that VRUs need to transmit and receive may not be transmitted properly. The same phenomenon may occur by acting as interference to other devices using the corresponding band (eg, a device mounted on a vehicle, a terminal, etc.). In particular, VRUs may have limited resources in terms of battery power, etc. Due to the aforementioned radio resource collision, interference, etc., operations such as resource (re)search and retransmission may occur more frequently, thereby further accelerating battery consumption.

Therefore, as one of the methods for solving the above-described problem, it is important for VRUs to reduce unnecessary message transmission operations. As an example, with respect to a specific VRU (VRU1) that is trying to transmit a safety message, when another VRU(s) (VRU2) is transmitting a safety message in an area very close to VRU1, the VRU1 may not need to transmit the safety message because the surrounding vehicles only need to recognize the existence of the VRU(s). That is, each of the other VRUs in the transmission area of VRU2 may be treated as a cluster member implicitly included in the cluster represented by VRU2.

In other words, this method is a method of assigning responsibility to a specific VRU or a small number of VRUs. The method may be applied when the corresponding VRU(s) has a characteristic (e.g., higher capability, high power, VRU in guardian role, etc.) distinguishing it from other VRUs or does not require a separate operation for forming a cluster (For example, when coverage of a specific VRU or a specific zone is determined as a cluster area).

On the other hand, when a cluster is created between VRUs in the same state or arbitrary VRUs having no dependency relationship, the roles of the VRUs may be equal. In this case, for fairness, a method of transmitting safety messages alternately may be preferable. Specifically, when VRUs with similar states cluster, for example, when VRUs having similar mobility are clustered, at a specific transmission time, a method of transmitting a cluster-related message only to specific VRU(s) whose transmission turn has arrived may be considered. That is, VRUs that have similar mobility between VRUs and satisfy detailed clustering conditions (e.g., mobility difference within a specific threshold) may be clustered. Contrary to the above, in this method, when only information of a transmitting VRU is transmitted, a difference may occur from information on a cluster including the VRU. This is because actual cluster information (e.g., cluster unit velocity, cluster center position, cluster size, etc.) is determined as a value obtained by combining the mobility of individual VRUs, not individual VRUs.

It is desirable for VRUs to collect and calculate (e.g., arithmetic mean) the latest VRU information at the same time to determine the parameters of such a cluster, but, since VRUs transmit cluster information and/or related parameters derived from them in turn, it is desirable to derive the latest information by combining the safety message received by each of the VRUs and the information obtained by the VRUs.

In the present disclosure, when moving by clustering between known VRUs or moving by clustering between arbitrary VRUs, this disclosure describes a method for maintaining a corresponding VRU cluster. More specifically, this disclosure proposes a method for updating cluster information received by the VRU that sends (or should send) a message about cluster information, information about the historical mobility of the VRU, and/or cluster information based on the current or latest mobility information of the corresponding VRU.

After the VRU detects mobility and operates as a VRU mode, it detects a surrounding cluster (normal cluster or free cluster) and joins the cluster, alternatively, an existing subscribed cluster (e.g., a subscribed cluster) may be detected and joined to the corresponding cluster. In a situation where the M(master)-VRU and V(very)-VRU constituting the subscription cluster are physically moved, in the process of recognizing and clustering cluster members in the beginning, and while moving while maintaining the cluster (or maintaining mobility), some members, especially V-VRUs, may leave. In this case, in order to prevent an accident, it is necessary to notify the M-VRU as well as the surrounding network and/or vehicles. Here, the M-VRU may be a relationship that manages the V-VRU or the V-VRU may have a relationship dependent on the M-VRU.

Hereinafter, cluster management will be described.

First, a method for maintaining mobility of the cluster will be described.

As one of the mobility maintenance methods, the M-VRU may transmit a PSM message, and the remaining V-VRUs may enter a reception mode. In other words, the V-VRUs may determine whether to leave the cluster after receiving the PSM message.

Specifically, each V-VRU may determine whether to continue to belong to the corresponding cluster based on the mobility of the M-VRU (e.g., location, velocity, direction, etc.) or the mobility of the cluster. In this case, the mobility of the M-VRU can be confirmed through a safety message transmitted by the M-VRU. The above method may be applied when the M-VRU transmits information on individual VRUs, not information on VRU clusters. Furthermore, when the M-VRU or other V-VRU transmits information on the VRU cluster, the mobility of the cluster may be confirmed through the safety message transmitted by the VRU corresponding to the M-VRU.

Alternatively, not only the M-VRU but also each of the V-VRUs may transmit the PSM message, and other V-VRUs and/or the M-VRU may receive the message.

As described above, when a message transmitted by a representative VRU such as an M-VRU serves as a reference, whether to maintain the cluster may be determined based on the mobility information transmitted in the corresponding message. On the other hand, if the M-VRU does not always transmit a safety message, the message of the M-VRU cannot be the standard, it may be set based on a message (e.g., a safety message for cluster information) commonly transmitted by each VRU.

Next, a method for estimating cluster parameters will be described.

It may not be possible to accurately measure the mobility, shape, etc. of a cluster unless all VRUs simultaneously transmit a message containing their mobility information and process the messages at once in an infrastructure, network, or the like. In this case, each of the VRUs can only estimate the mobility of the cluster by relying on cluster information already received at the time of its transmission and information about itself directly measured by the VRUs. Accordingly, the cluster parameter may be estimated based on methods to be described later.

First, a method of estimating a cluster parameter related to a cluster position will be described. Here, the cluster location may mean a location with respect to the center of the cluster.

Assuming that the velocities between VRUs are almost similar, the cluster position can be estimated in the following way. The method described below can be equally used for clustering between known VRUs as well as clustering between arbitrary VRUs. On the other hand, the characteristic that the velocity between VRUs is almost similar may be a prerequisite for cluster establishment.

The central position of the cluster at a specific point in time may be indicated in relation to the positions of VRUs constituting the cluster. As an example, the actual value of the central position of the cluster may be expressed as an average value of the positions of all VRUs. In this case, unless the VRU knows all the positions of all VRUs in the cluster at a specific point in time, the exact center position cannot be calculated, and only estimation is possible.

When the actual center position of the cluster at a specific time point $t_k$ is $C_p(t_k)$, $C_p(t_k)$ can be expressed as the following equation.

$$C_p(f_k) = \sum_{i=1}^{n-1} d(p_i, t_k) \qquad \text{[Equation 1]}$$

Here, the i-th VRU among all n VRUs in the cluster is $p_i$, and the position at the four viewpoints of pi is $d(p_i, t_k)$.

When the transmission period of the PSM message is PT (e.g., 1 second), all VRUs alternately transmit the PSM message, when there are n VRUs in a cluster, one VRU transmits a PSM message every n*PT. That is, when a specific VRU acquires information in the same manner, there is inevitably a time difference of n*PT between PSM messages sequentially transmitted by the VRUs.

When the location information reflected by the transmitting VRU pi when estimating the cluster location at the time of PSM message transmission is $d_A(p_i, t_k)$, it may be necessary to exclude the corresponding location information from the received cluster information at the time of transmission of the next message to increase the accuracy of estimation and reduce latency. When n VRUs transmit PSM messages alternately in order, the transmitting VRU pi may be expressed as $p_{mod}(k, n)$, and the estimate of the cluster position may be expressed as follows.

$$C'_p(t_k) = C'_p(t_{k-n}) - d_A(p_{mod(k,n)}, t_{k-n}) + d_A(p_{mod(k,n)}, t_k) \qquad \text{[Equation 2]}$$

Meanwhile, a method of utilizing the measured information, that is, a method of deriving $d_A(p_i, t_k)$ or $d_A(p_{mod}(k, n), t_k)$ is as follows.

(Method 1) In order to minimize the time difference from the actual cluster location, each VRU may update the cluster location using only the latest information (e.g., the most recent location of the corresponding VRU) measured by the VRUs. As an example, it may be expressed by the following formula.

$$d_A(p_{mod(k,n)}, t_k) = d(p_{mod(k,n)}, t_k) \qquad \text{[Equation 3]}$$

(Method 2) In Method 1, when the velocity and direction of each VRU are variable, in particular, when the velocity and direction of each VRU are changed differently for each VRU, the estimate may be inaccurate. Accordingly, in order to respond to a change in the velocity of the VRU, each VRU may use an average of location information for a predetermined period. For example, when n VRUs exist in a cluster, one VRU may measure a change in position during n*PT, which is a transmission period. If the position value is measured at a specific time point t and the measurement operation is repeated every n*PT, the average of the position values at time t and t+n*PT may be calculated or more sample values (e.g., n) may be obtained and used. That is, the following expression can be used.

$$d_A(p_{mod(k,n)}, t_k) = \left( \sum_{i=k-n+1}^{k} d(p_{mod(k,n)}, t_i) \right) \bigg/ n \qquad \text{[Equation 4]}$$

However, as the size of the average window or the number of samples increases, the latency of the estimated value may increase.

On the other hand, if there is a large difference between the $C'_p(t_k)$ value and the $d_A(p_{mod}(k, n), t_k)$ value, in particular, when it is determined that the cluster is out of coverage (e.g., 100 meters), it may be determined that the cluster has departed.

Meanwhile, the VRU that has received the information on the cluster location value may continuously update the cluster location by replacing the previously measured value with the newly measured value.

Figure 16:
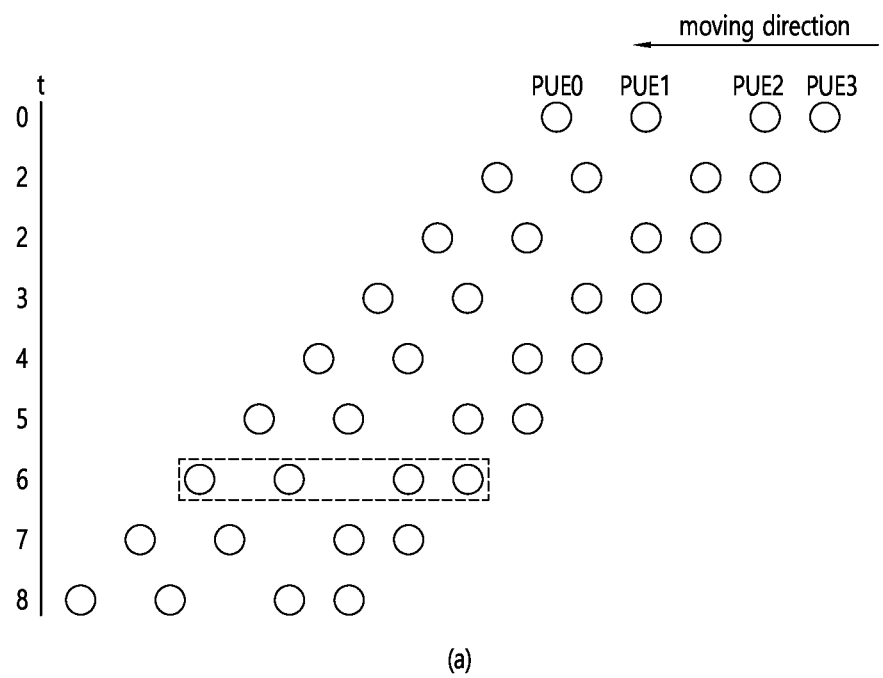
FIG. 16 is for explaining an example of a method for estimating a cluster position according to some implementations of the present disclosure.
Figure 16:
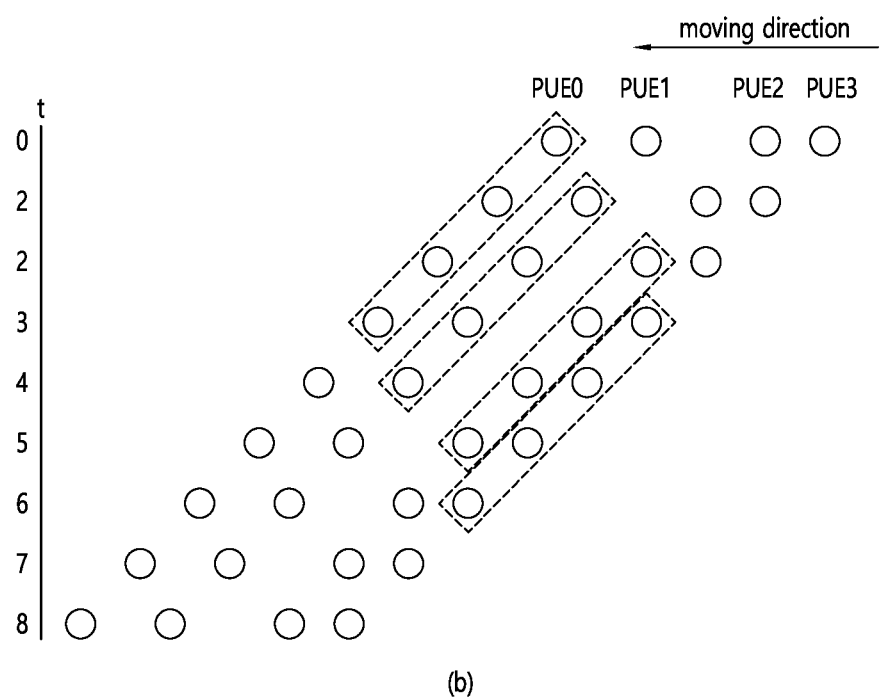

FIG. 16 is for explaining an example of a method for estimating a cluster position according to some implementations of the present disclosure.

Specifically, FIG. 16 relates to a method of estimating a location of a cluster by configuring one cluster in which four VRUs PUE0, PUE1, PUE2 and PUE3 are configured.

As an example, when the VRUs (PUE0, PUE1, PUE2, and PUE3) move in a certain direction as in FIG. 16 (a), the actual location of the cluster at time t=6 may be determined by the locations of PUE0 to PUE3 at the time point. As an example, the location of the cluster may be determined by calculating an average of the locations of PUE0 to PUE3.

Here, referring to FIG. 16 (b), when VRUs alternately estimate the cluster location, if the time when PUE3 transmits the PSM message is time t=6, only PUE3 itself may reflect the location information for time t=6. As an example, referring to method 1 described above, the average value of position at time t=3 of PUE0, location at time t=4 of PUE1, location at time t=5 of PUE2, and position at time t=6 of PUE3 can be used as an estimate of the cluster location. As another example, referring to method 2 described above, a value obtained by averaging the "positions at t=3 time points of PUE0 as well as the positions at t=0 to t=3 time points" may be used, and the same method may be applied to PUE1 to PUE3.

Figure 17:
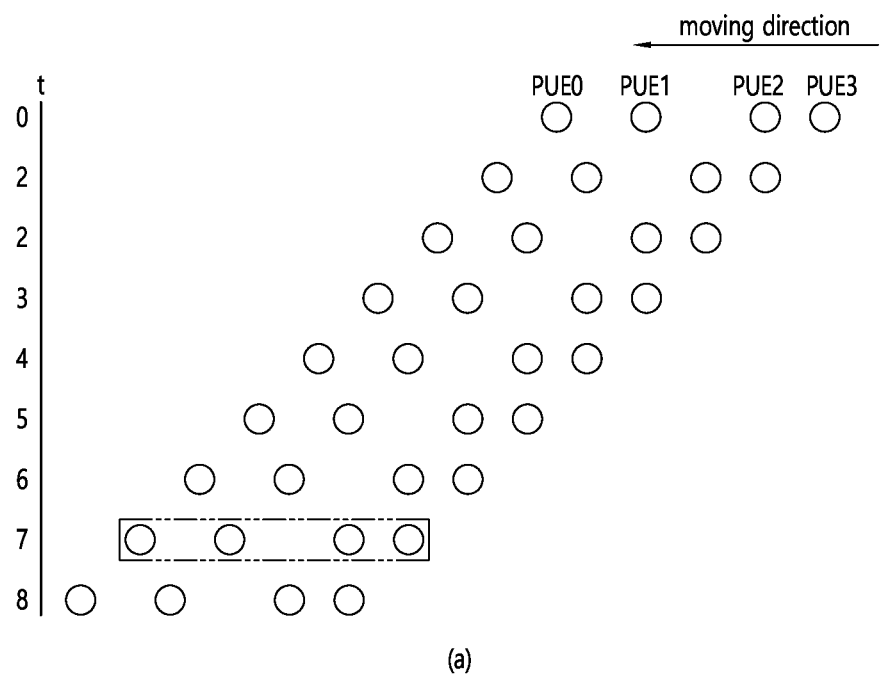
FIG. 17 is for explaining an example from another viewpoint of FIG. 16.
Figure 17:
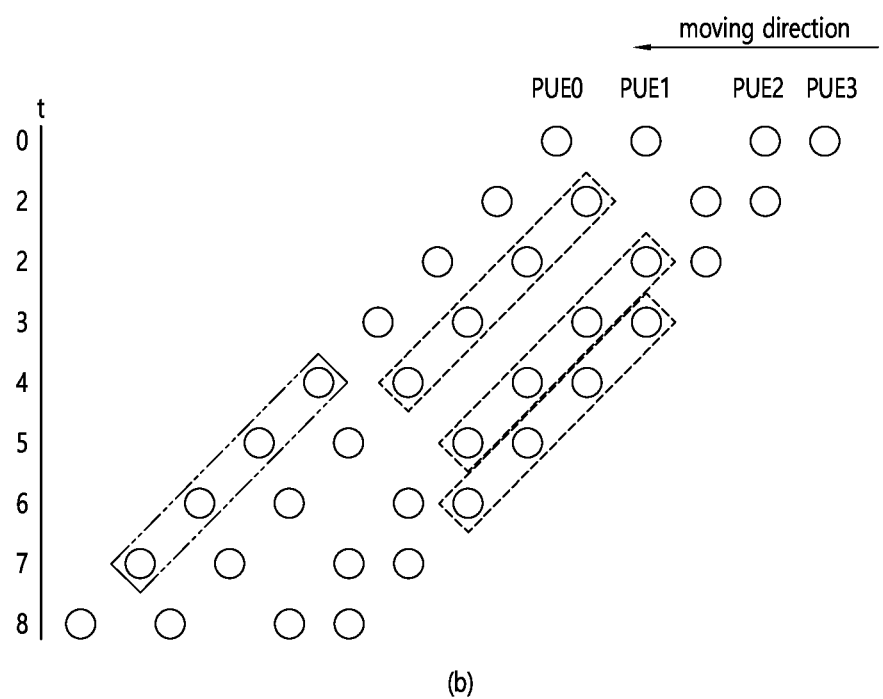

FIG. 17 is for explaining an example from another viewpoint of FIG. 16.

Specifically, FIG. 17 relates to time t=7 of the example of FIG. 16. (a) of FIG. 17 indicates that the cluster location is updated by the locations of PUE0 to PUE3 at time t=7 (e.g., the average value for the updated locations), (b) of FIG. 17 indicates obtaining a new estimated value by adding, except for the average value of the position at t=3 or the position at t=0 to t=3, which PUE0, where the transmission order has returned, reflects previously, a new value, i.e. the position at time t=7 or the average of the positions at time points t=4 to t=7

Figure 18:
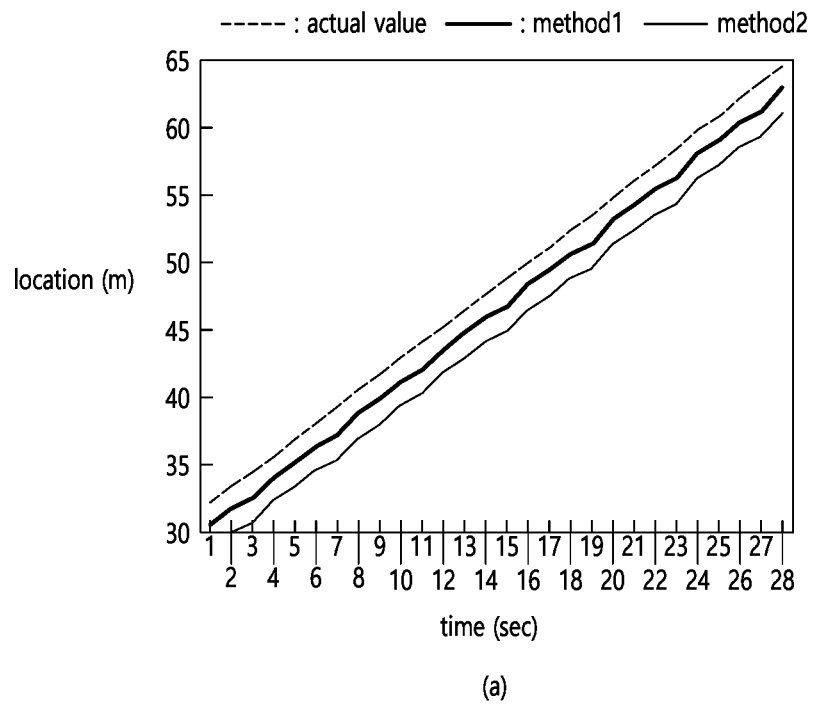
FIG. 18 is for comparison of cluster position estimation methods.
Figure 18:
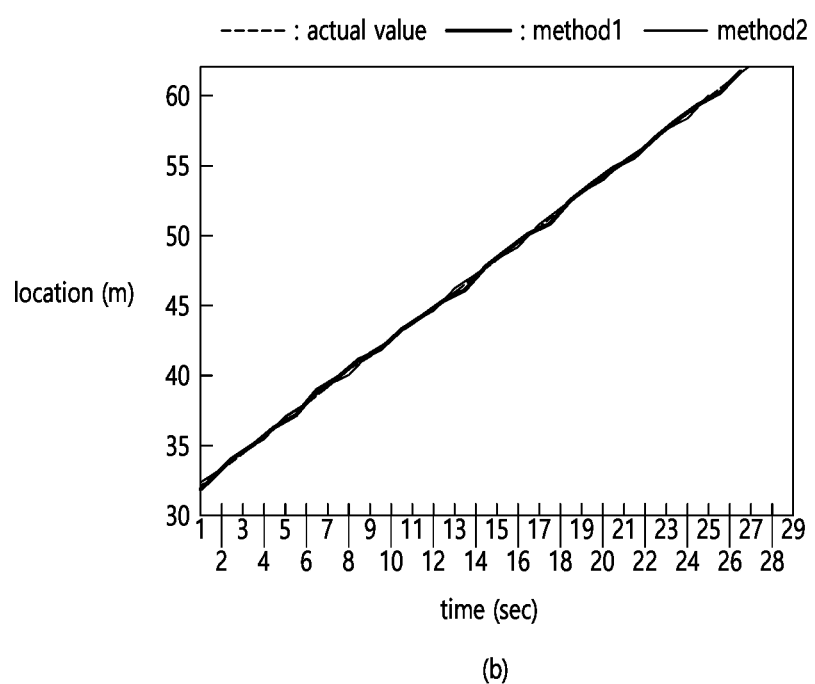

FIG. 18 is for comparison of cluster position estimation methods.

FIG. 18 is a graph showing, as an example, a value in which a cluster position changes while VRUs having a velocity of 0.8 to 1.6 m/s (a velocity of 3 to 6 km/h) move. Referring to (a) of FIG. 18, it can be seen that the above-described method 1 appears closer to the actual value as it is estimated using only the latest value. Here, since Method 1 is more advantageous when the change in velocity is small, the fluctuation of the estimated value may be larger than that of Method 2. The time difference of the estimated value is different according to each method, when the result values for Method 1 and Method 2 are pulled for 1.5 seconds and 3 seconds, respectively, and the values are compared, it can be confirmed that they are similar to the actual values as shown in (b) of FIG. 18.

Next, a method of estimating a cluster parameter related to a cluster velocity will be described.

Assuming that the velocities between VRUs are almost the same, the cluster velocity can be estimated in the following way. The following method may be equally used for clustering between known VRUs as well as clustering between arbitrary VRUs. On the other hand, the characteristic that the velocity between VRUs is almost similar may be a prerequisite for cluster establishment.

At a specific point in time, the cluster velocity may be expressed in relation to the velocities of VRUs constituting the cluster. As an example, the actual value of the cluster velocity may be expressed as an average value of the velocity of all VRUs. In this case, unless the entity knows all the velocities of all VRUs in the cluster at a specific point in time, the exact center position cannot be obtained, and only estimation is possible.

When the actual velocity of the cluster at a specific time point tk is Cv(tk), Cv(tk) can be expressed as the following equation.

$$C_v(t_k) = \sum_{i=1}^{n-1} v(p_i, t_k) \qquad \text{[Equation 5]}$$

Here, pi denotes the i-th VRU among all n VRUs in the cluster, and $v(p_i, t_k)$ denotes the velocity of pi at the tk time point, respectively.

When the transmission period of the PSM message is PT (e.g., 1 second), all VRUs alternately transmit the PSM message, when there are n VRUs in a cluster, one VRU transmits a PSM message every n*PT. That is, when a specific VRU acquires information in the same manner, there is inevitably a time difference of n*PT between PSM messages sequentially transmitted by the VRUs.

When the position information reflected by the transmission VRU pi when estimating the cluster velocity at the time of PSM message transmission is $v_A(p_i, t_k)$, it may be necessary to exclude the velocity information from the received cluster information at the time of transmission of the next message to increase the accuracy of estimation and reduce latency. When n VRUs transmit PSM messages in turn, transmission VRU $p_i$ at time $t_k$ may be expressed as $p_{mod}(k, n)$, the estimate for the cluster velocity can be expressed as the following equation.

$$C'_v(t_k)=C'_v(t_{k-n})-v_A(p_{mod(k,n)},t_{k-n})+v_A(p_{mod(k,n)},t_k) \qquad \text{[Equation 6]}$$

Meanwhile, a method of utilizing the measured information, that is, a method of deriving $v_A(p_i, t_k)$ or $v_A(p_{mod}(k,n), t_k)$ is as follows.

(Method 3) In order to minimize the disparity of the actual cluster location, each VRU may update the cluster velocity using only the latest information (e.g., the most recent location of the corresponding VRU) measured by the VRUs. As an example, it may be expressed by the following formula.

$$v_A(p_{mod(k,n)},t_k)=(d(p_{mod(k,n)},t_k)-d(p_{mod(k,n)},t_{k-1}))/\Delta t \qquad \text{[Equation 7]}$$

Here, $\Delta t$ may be the period in which the PSM message is transmitted, that is, the aforementioned PT.

On the other hand, if the estimate for the cluster velocity is expressed as the position of the VRU, the following equation is obtained.

$$C'_v(t_k)=C'_v(t_{k-n})+(d(p_{mod(k,n)},t_k)-d(p_{mod(k,n)},t_{k-1})-d(p_{mod(k,n)},t_{k-n})+d(p_{mod(k,n)},t_{k-n-1}))/\Delta t \qquad \text{[Equation 8]}$$

(Method 4) When the instantaneous value is used as in method 3, when the velocity and direction of each VRU are variable, in particular, the estimate may be inaccurate if it varies for each VRU. Accordingly, in order to respond to a change in the velocity of the VRU(s), each VRU may use the average velocity information for a predetermined period. As an example, when a cluster consists of n VRUs, one VRU may measure a change in velocity during n*PT, which is a transmission period. Measure the velocity value at a specific point called t, when this is performed at least every n*PT, the velocity values at the time t and t+n*PT are averaged, or the same or greater sample value (e.g., n) can be obtained and used. As an example, it can be expressed as the following equation.

$$v_A(p_{mod(k,n)}, t_k) = \left( \sum_{i=k-n+1}^{k} v(p_{mod(k,n)}, t_i) \right) \bigg/ n \qquad \text{[Equation 9]}$$

Here, if $v_A(p_{mod}(k, n), t_k)$ is expressed as $(d(p_{mod}(k, n), t_i)-d(p_{mod}(k, n), t_{i-1}))/\Delta t$, equation 9 can be expressed as the following equation.

$$v_A(p_{mod(k,n)},t_k)=(d(p_{mod(k,n)},t_k)-d(p_{mod(k,n)},t_{k-n}))/n\Delta t \qquad \text{[Equation 10]}$$

Equation 10 is equivalent to dividing the position at the start point and the end point by the total observation time.

Meanwhile, the latency of the estimated value may increase as the size of the window for taking the average increases, that is, as the number of VRUs in the cluster increases. If the estimate for the cluster velocity is expressed as the position of the VRU, the following equation is obtained.

$$C'_v(t_k)=C'_v(t_{k-n})+(d(p_{mod(k,n)},t_k)-2*d(p_{mod(k,n)},t_{k-n})+d(p_{mod(k,n)},t_{k-2n}))/n\Delta t$$

On the other hand, when there is a large difference between the C' ($t_k$) value and the $v_A(p_{mod}(k, n), t_k)$ value (for example, the same or more than 1 m/s difference), it can be determined that the cluster has left.

Figure 19:
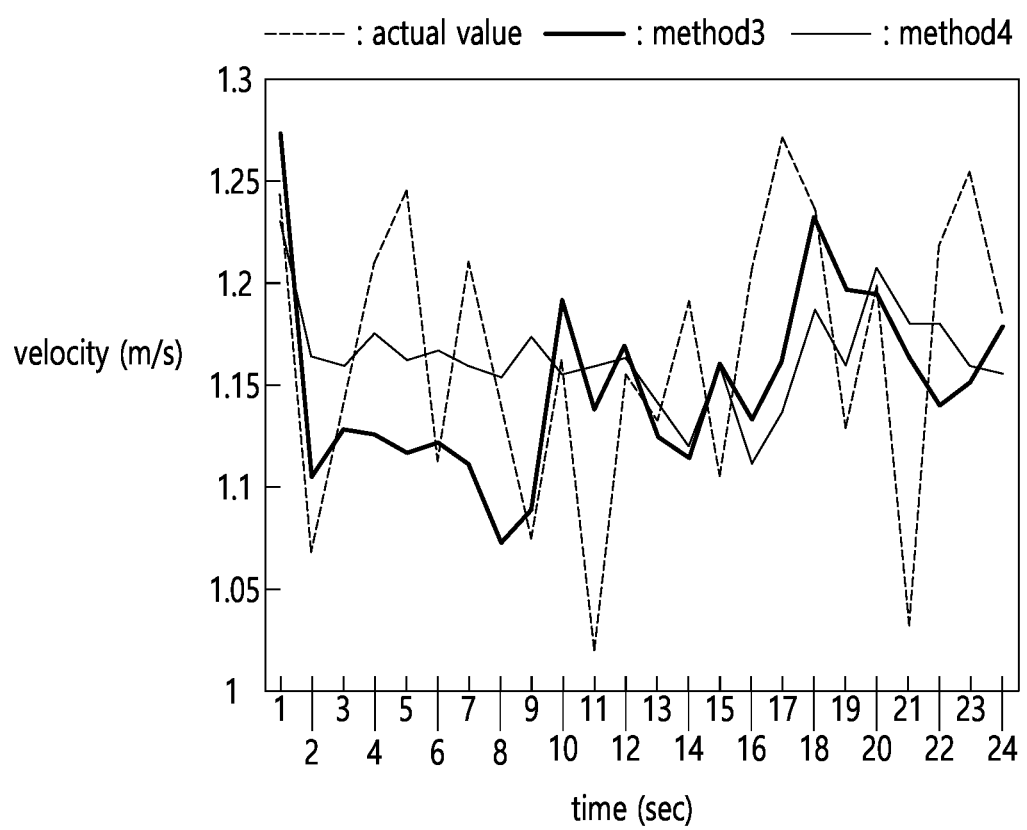
FIG. 19 is for comparison of cluster velocity estimation methods.

FIG. 19 is for comparison of cluster velocity estimation methods.

Specifically, FIG. 18 is a graph showing the value of the cluster velocity changing while VRUs having a velocity of 0.8 to 1.6 m/s (velocity of 3 to 6 km/h) move. Referring to FIG. 18, according to method 3, as it is estimated using only the latest value, it tends to be closer to the actual value even when the velocity change occurs to some extent (that is, fluctuation occurs). According to method 4, even if the cluster velocity fluctuation occurs to some extent, the fluctuation is attenuated by the average.

Figure 20:
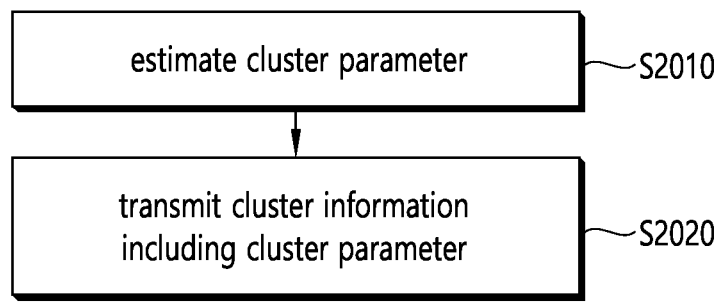
FIG. 20 is a flowchart of an example of a method for transmitting cluster information of a terminal according to some implementations of the present disclosure.

FIG. 20 is a flowchart of an example of a method for transmitting cluster information of a terminal according to some implementations of the present disclosure.

Specifically, FIG. 20 exemplifies the operation of one terminal among a plurality of terminals constituting the cluster.

Referring to FIG. 20, the terminal estimates a cluster parameter (S2010). Here, the cluster parameter may include at least one of a center position of the cluster and a velocity of the cluster.

Thereafter, the terminal transmits cluster information including the cluster parameter (S2020).

Here, the central position of the cluster may be determined based on the position of the terminal, and the velocity of the cluster may be determined based on the velocity of the terminal. Specifically, the location of the terminal and the velocity of the terminal may be determined by methods proposed in the present disclosure, such as Methods 1 to 4, and the like.

On the other hand, it is natural that various embodiments proposed in the present disclosure may be applied to the example of FIG. 20.

Figure 21:
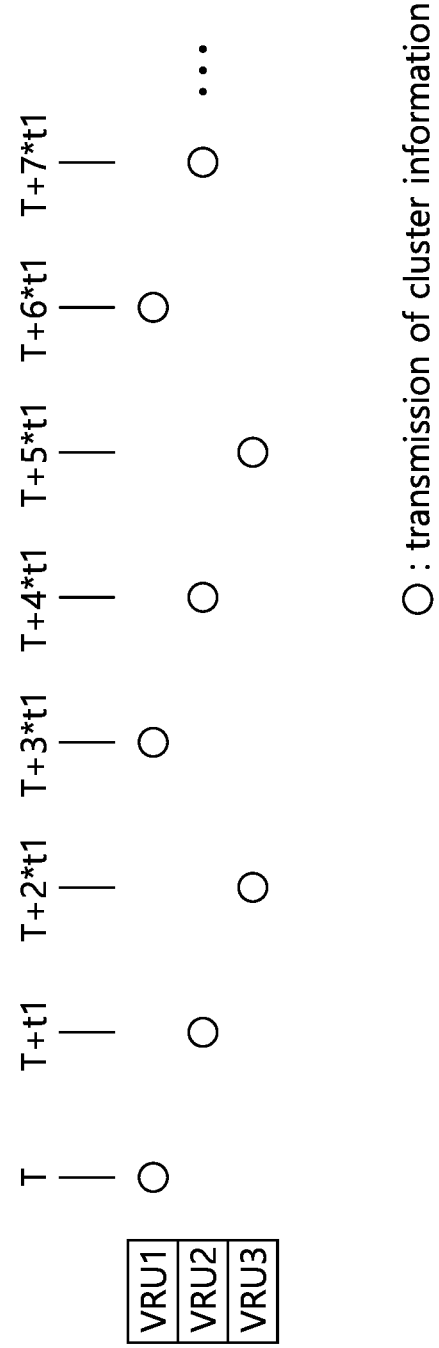
FIG. 21 is for explaining an example of a method for transmitting cluster information of a terminal according to some implementations of the present disclosure.

FIG. 21 is for explaining an example of a method for transmitting cluster information of a terminal according to some implementations of the present disclosure.

In FIG. 21, it is assumed that, in a situation where three VRUs constitute one cluster, the three VRUs transmit cluster information alternately in order.

Referring to FIG. 21, cluster information is transmitted in the order of VRU1, VRU2, and VRU3 at an arbitrary time T. That is, VRU1 transmits cluster information at time T, VRU2 transmits cluster information at time T+t1, VRU3 transmits cluster information at time T+2*t1, again, VRU1 transmits cluster information at time T+3*t1. That is, the cluster information is periodically transmitted every t1, each VRU transmits cluster information with a period of 3*t1.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim may be combined to be implemented as an apparatus, and the technical features of the method claim of the present specification and the technical features of the apparatus claim may be combined and implemented as a method.

The methods proposed in this specification can also be performed by, in addition to the terminal, at least one computer readable medium including instructions based on being executed by at least one processor (computer readable medium), the apparatus configured to control the terminal including one or more processors and one or more processors operably coupled by the one or more processors, and one or more memories for storing instructions, where the one or more processors execute the instructions to perform the methods proposed herein. Also, it is obvious that, according to the methods proposed in this specification, an operation by the base station corresponding to the operation performed by the terminal may be considered.

Hereinafter, an example of a communication system to which the present disclosure is applied will be described.

Although not limited to this, various descriptions, functions, procedures, proposals, methods, and/or operation flowcharts of the present disclosure disclosed in this document may be applied to various fields requiring wireless communication/connection (e.g., 5G) between devices.

Hereinafter, it will be exemplified in more detail with reference to the drawings. In the following drawings/descriptions, the same reference numerals may represent the same or corresponding hardware blocks, software blocks, or functional blocks, unless otherwise indicated.

Figure 22:
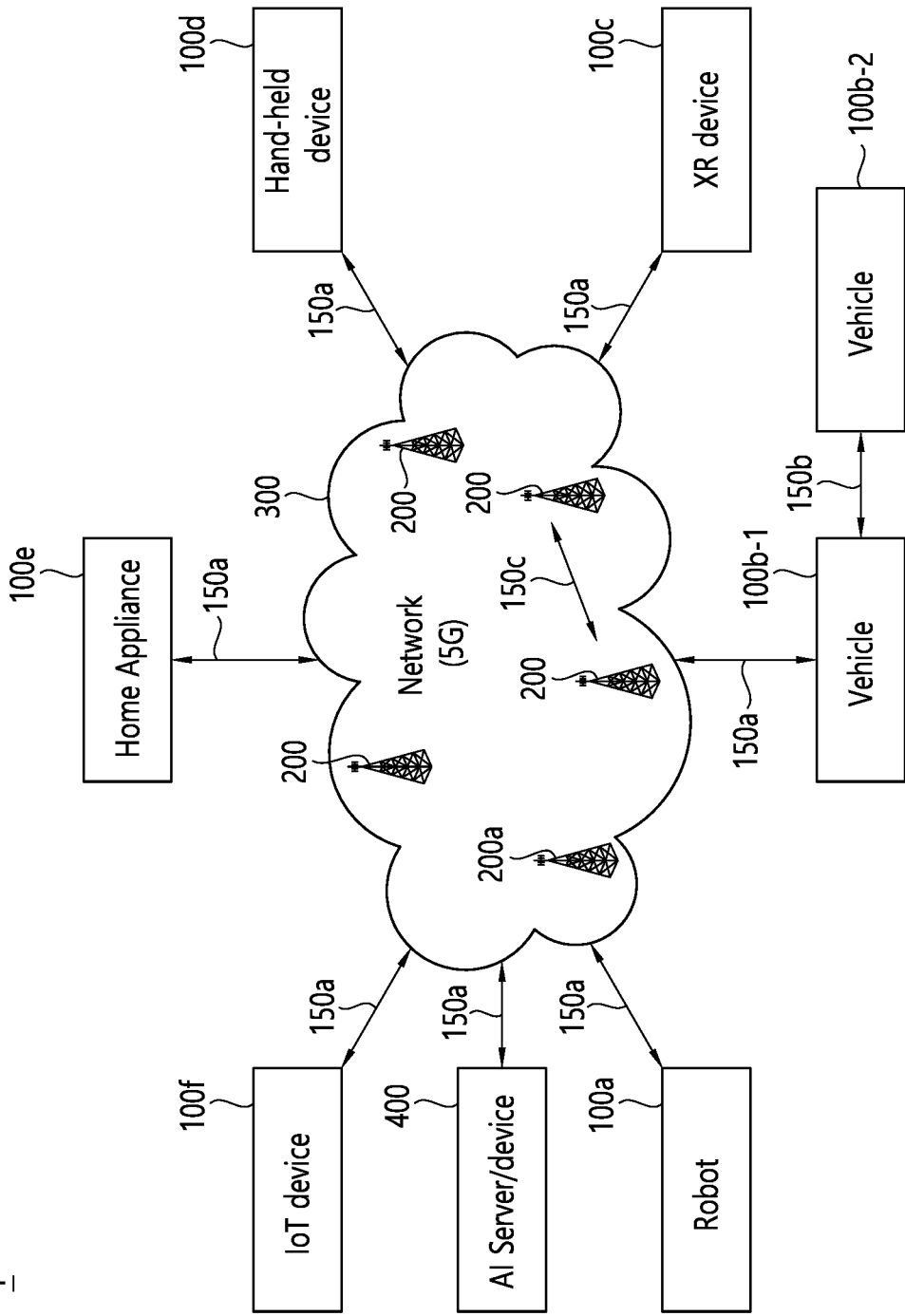
FIG. 22 shows a communication system (1), in accordance with an embodiment of the present disclosure.

FIG. 22 shows a communication system (1), in accordance with an embodiment of the present disclosure.

Referring to FIG. 22, a communication system (1) to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot (100a), vehicles (100b-1, 100b-2), an eXtended Reality (XR) device (100c), a hand-held device (100d), a home appliance (100e), an Internet of Things (IoT) device (100f), and an Artificial Intelligence (AI) device/server (400). For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, and so on. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device (200a) may operate as a BS/network node with respect to other wireless devices.

The wireless devices (100a~100f) may be connected to the network (300) via the BSs (200). An AI technology may be applied to the wireless devices (100a~100f) and the wireless devices (100a~100f) may be connected to the AI server (400) via the network (300). The network (300) may be configured using a 3G network, a 4G (e.g., LTE) network, or a 5G (e.g., NR) network. Although the wireless devices (100a~100f) may communicate with each other through the BSs (200)/network (300), the wireless devices (100*a*~100*f*) may perform direct communication (e.g., sidelink communication) with each other without passing through the BSs/network. For example, the vehicles (100*b*-1, 100*b*-2) may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices (100*a*~100*f*).

Wireless communication/connections (150*a*, 150*b*, 150*c*) may be established between the wireless devices (100*a*~100*f*)/BS (200), or BS (200)/BS (200). Herein, the wireless communication/connections may be established through various RATs (e.g., 5G NR) such as uplink/downlink communication (150*a*), sidelink communication (150*b*) (or, D2D communication), or inter BS communication (e.g. relay, Integrated Access Backhaul (IAB)). The wireless devices and the BSs/the wireless devices may transmit/receive radio signals to/from each other through the wireless communication/connections (150*a*, 150*b*). For example, the wireless communication/connections (150*a*, 150*b*) may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 23:
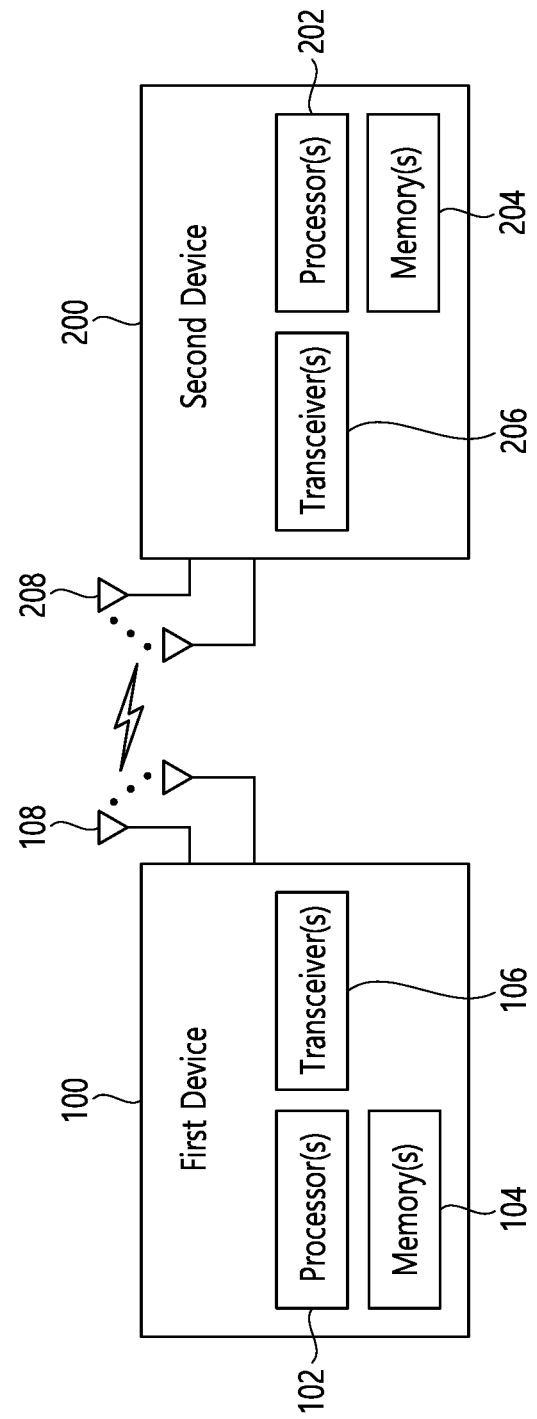
FIG. 23 shows wireless devices, in accordance with an embodiment of the present disclosure.

FIG. 23 shows wireless devices, in accordance with an embodiment of the present disclosure.

Referring to FIG. 23, a first wireless device (100) and a second wireless device (200) may transmit radio signals through a variety of RATs (e.g., LTE and NR). Herein, {the first wireless device (100) and the second wireless device (200)} may correspond to {the wireless device (100*x*), the BS (200)} and/or {the wireless device (100*x*), the wireless device (100*x*)} of FIG. 22.

The first wireless device (100) may include one or more processors (102) and one or more memories (104) and additionally further include one or more transceivers (106) and/or one or more antennas (108). The processor(s) (102) may control the memory(s) (104) and/or the transceiver(s) (106) and may be configured to implement the descriptions, functions, procedures, proposals, methods, and/or operational flowcharts disclosed in this document. For example, the processor(s) (102) may process information within the memory(s) (104) to generate first information/signals and then transmit radio signals including the first information/signals through the transceiver(s) (106). The processor(s) (102) may receive radio signals including second information/signals through the transceiver (106) and then store information obtained by processing the second information/signals in the memory(s) (104). The memory(s) (104) may be connected to the processor(s) (102) and may store a variety of information related to operations of the processor(s) (102). For example, the memory(s) (104) may store software code including commands for performing a part or the entirety of processes controlled by the processor(s) (102) or for performing the descriptions, functions, procedures, proposals, methods, and/or operational flowcharts disclosed in this document. Herein, the processor(s) (102) and the memory(s) (104) may be a part of a communication modem/circuit/chip designed to implement RAT (e.g., LTE or NR). The transceiver(s) (106) may be connected to the processor(s) (102) and transmit and/or receive radio signals through one or more antennas (108). Each of the transceiver(s) (106) may include a transmitter and/or a receiver. The transceiver(s) (106) may be interchangeably used with Radio Frequency (RF) unit(s). In the present disclosure, the wireless device may represent a communication modem/circuit/chip.

The second wireless device (200) may include one or more processors (202) and one or more memories (204) and additionally further include one or more transceivers (206) and/or one or more antennas (208). The processor(s) (202) may control the memory(s) (204) and/or the transceiver(s) (206) and may be configured to implement the descriptions, functions, procedures, proposals, methods, and/or operational flowcharts disclosed in this document. For example, the processor(s) (202) may process information within the memory(s) (204) to generate third information/signals and then transmit radio signals including the third information/signals through the transceiver(s) (206). The processor(s) (202) may receive radio signals including fourth information/signals through the transceiver(s) (106) and then store information obtained by processing the fourth information/signals in the memory(s) (204). The memory(s) (204) may be connected to the processor(s) (202) and may store a variety of information related to operations of the processor(s) (202). For example, the memory(s) (204) may store software code including commands for performing a part or the entirety of processes controlled by the processor(s) (202) or for performing the descriptions, functions, procedures, proposals, methods, and/or operational flowcharts disclosed in this document. Herein, the processor(s) (202) and the memory(s) (204) may be a part of a communication modem/circuit/chip designed to implement RAT (e.g., LTE or NR). The transceiver(s) (206) may be connected to the processor(s) (202) and transmit and/or receive radio signals through one or more antennas (208). Each of the transceiver(s) (206) may include a transmitter and/or a receiver. The transceiver(s) (206) may be interchangeably used with RF unit(s). In the present disclosure, the wireless device may represent a communication modem/circuit/chip.

Hereinafter, hardware elements of the wireless devices (100, 200) will be described more specifically. One or more protocol layers may be implemented by, without being limited to, one or more processors (102, 202). For example, the one or more processors (102, 202) may implement one or more layers (e.g., functional layers such as PHY, MAC, RLC, PDCP, RRC, and SDAP). The one or more processors (102, 202) may generate one or more Protocol Data Units (PDUs) and/or one or more Service Data Unit (SDUs) according to the descriptions, functions, procedures, proposals, methods, and/or operational flowcharts disclosed in this document. The one or more processors (102, 202) may generate messages, control information, data, or information according to the descriptions, functions, procedures, proposals, methods, and/or operational flowcharts disclosed in this document. The one or more processors (102, 202) may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers (106, 206). The one or more processors (102, 202) may receive the signals (e.g., baseband signals) from the one or more transceivers (106, 206) and obtain the PDUs, SDUs, messages, control information, data, or information according to the descriptions, functions, procedures, proposals, methods, and/or operational flowcharts disclosed in this document.

The one or more processors (102, 202) may be referred to as controllers, microcontrollers, microprocessors, or microcomputers. The one or more processors (102, 202) may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors (102, 202). The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors (102, 202) or stored in the one or more memories (104, 204) so as to be driven by the one or more processors (102, 202). The descriptions, functions, procedures, proposals, methods, and/or operational flowcharts disclosed in this document may be implemented using firmware or software in the form of code, commands, and/or a set of commands.

The one or more memories (104, 204) may be connected to the one or more processors (102, 202) and store various types of data, signals, messages, information, programs, code, instructions, and/or commands. The one or more memories (104, 204) may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories (104, 204) may be located at the interior and/or exterior of the one or more processors (102, 202). The one or more memories (104, 204) may be connected to the one or more processors (102, 202) through various technologies such as wired or wireless connection.

The one or more transceivers (106, 206) may transmit user data, control information, and/or radio signals/channels, mentioned in the methods and/or operational flowcharts of this document, to one or more other devices. The one or more transceivers (106, 206) may receive user data, control information, and/or radio signals/channels, mentioned in the descriptions, functions, procedures, proposals, methods, and/or operational flowcharts disclosed in this document, from one or more other devices. For example, the one or more transceivers (106, 206) may be connected to the one or more processors (102, 202) and transmit and receive radio signals. For example, the one or more processors (102, 202) may perform control so that the one or more transceivers (106, 206) may transmit user data, control information, or radio signals to one or more other devices. The one or more processors (102, 202) may perform control so that the one or more transceivers (106, 206) may receive user data, control information, or radio signals from one or more other devices. The one or more transceivers (106, 206) may be connected to the one or more antennas (108, 208) and the one or more transceivers (106, 206) may be configured to transmit and receive user data, control information, and/or radio signals/channels, mentioned in the descriptions, functions, procedures, proposals, methods, and/or operational flowcharts disclosed in this document, through the one or more antennas (108, 208). In this document, the one or more antennas may be a plurality of physical antennas or a plurality of logical antennas (e.g., antenna ports). The one or more transceivers (106, 206) may convert received radio signals/channels, and so on, from RF band signals into baseband signals in order to process received user data, control information, radio signals/channels, and so on, using the one or more processors (102, 202). The one or more transceivers (106, 206) may convert the user data, control information, radio signals/channels, and so on, processed using the one or more processors (102, 202) from the base band signals into the RF band signals. To this end, the one or more transceivers (106, 206) may include (analog) oscillators and/or filters.

Figure 24:
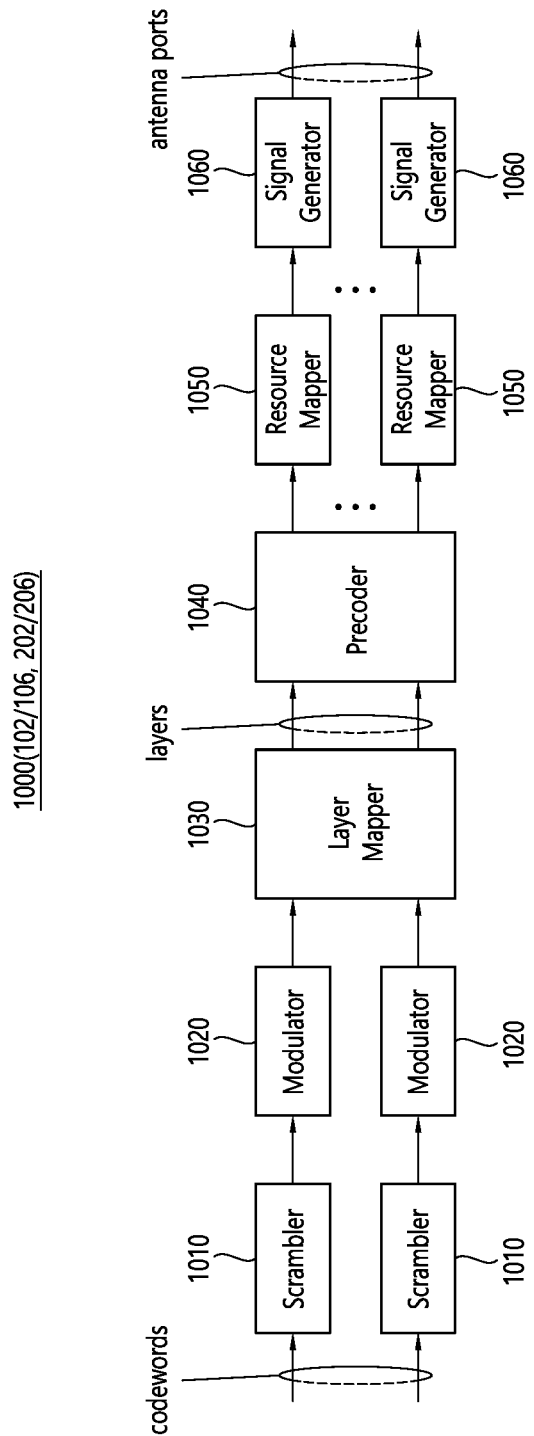
FIG. 24 shows a signal process circuit for a transmission signal, in accordance with an embodiment of the present disclosure.

FIG. 24 shows a signal process circuit for a transmission signal, in accordance with an embodiment of the present disclosure.

Referring to FIG. 24, a signal processing circuit (1000) may include scramblers (1010), modulators (1020), a layer mapper (1030), a precoder (1040), resource mappers (1050), and signal generators (1060). An operation/function of FIG. 24 may be performed, without being limited to, the processors (102, 202) and/or the transceivers (106, 206) of FIG. 23. Hardware elements of FIG. 24 may be implemented by the processors (102, 202) and/or the transceivers (106, 206) of FIG. 23. For example, blocks 1010~1060 may be implemented by the processors (102, 202) of FIG. 23. Alternatively, the blocks 1010~1050 may be implemented by the processors (102, 202) of FIG. 23 and the block 1060 may be implemented by the transceivers (106, 206) of FIG. 23.

Codewords may be converted into radio signals via the signal processing circuit (1000) of FIG. 24. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers (1010). Scramble sequences used for scrambling may be generated based on an initialization value, and the initialization value may include ID information of a wireless device. The scrambled bit sequences may be modulated to modulation symbol sequences by the modulators (1020). A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper (1030). Modulation symbols of each transport layer may be mapped (precoded) to corresponding antenna port(s) by the precoder (1040). Outputs z of the precoder (1040) may be obtained by multiplying outputs y of the layer mapper (1030) by an N*M precoding matrix W. Herein, N is the number of antenna ports and M is the number of transport layers. The precoder (1040) may perform precoding after performing transform precoding (e.g., DFT) for complex modulation symbols. Alternatively, the precoder (1040) may perform precoding without performing transform precoding.

The resource mappers (1050) may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators (1060) may generate radio signals from the mapped modulation symbols and the generated radio signals may be transmitted to other devices through each antenna. For this purpose, the signal generators (1060) may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures (1010~1060) of FIG. 24. For example, the wireless devices (e.g., 100, 200 of FIG. 23) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 25:
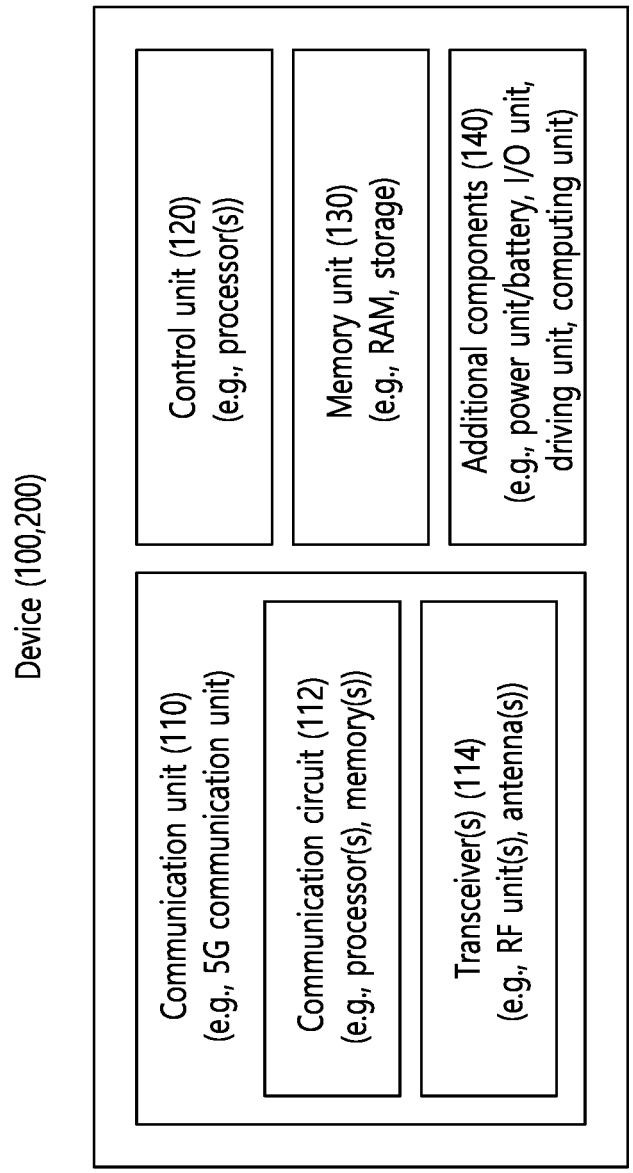
FIG. 25 shows another example of a wireless device, in accordance with an embodiment of the present disclosure.

FIG. 25 shows another example of a wireless device, in accordance with an embodiment of the present disclosure. The wireless device may be implemented in various forms according to a use-case/service (refer to FIG. 22).

Referring to FIG. 25, wireless devices (100, 200) may correspond to the wireless devices (100, 200) of FIG. 23 and may be configured by various elements, components, units/portions, and/or modules. For example, each of the wireless devices (100, 200) may include a communication unit (110), a control unit (120), a memory unit (130), and additional components (140). The communication unit may include a communication circuit (112) and transceiver(s) (114). For example, the communication circuit (112) may include the one or more processors (102, 202) and/or the one or more memories (104, 204) of FIG. 23. For example, the transceiver(s) (114) may include the one or more transceivers (106, 206) and/or the one or more antennas (108, 208) of FIG. 23. The control unit (120) is electrically connected to the communication unit (110), the memory (130), and the additional components (140) and controls overall operation of the wireless devices. For example, the control unit (120) may control an electric/mechanical operation of the wireless device based on programs/code/commands/information stored in the memory unit (130). The control unit (120) may transmit the information stored in the memory unit (130) to the exterior (e.g., other communication devices) via the communication unit (110) through a wireless/wired interface or store, in the memory unit (130), information received through the wireless/wired interface from the exterior (e.g., other communication devices) via the communication unit (110).

The additional components (140) may be variously configured according to types of wireless devices. For example, the additional components (140) may include at least one of a power unit/battery, input/output (I/O) unit, a driving unit, and a computing unit. The wireless device may be implemented in the form of, without being limited to, the robot (100a of FIG. 22), the vehicles (100b-1, 100b-2 of FIG. 22), the XR device (100c of FIG. 22), the hand-held device (100d of FIG. 22), the home appliance (100e of FIG. 22), the IoT device (100f of FIG. 22), a digital broadcast terminal, a hologram device, a public safety device, an MTC device, a medicine device, a fintech device (or a finance device), a security device, a climate/environment device, the AI server/device (400 of FIG. 22), the BSs (200 of FIG. 22), a network node, and so on. The wireless device may be used in a mobile or fixed place according to a use-example/service.

In FIG. 25, the entirety of the various elements, components, units/portions, and/or modules in the wireless devices (100, 200) may be connected to each other through a wired interface or at least a part thereof may be wirelessly connected through the communication unit (110). For example, in each of the wireless devices (100, 200), the control unit (120) and the communication unit (110) may be connected by wire and the control unit (120) and first units (e.g., 130, 140) may be wirelessly connected through the communication unit (110). Each element, component, unit/portion, and/or module within the wireless devices (100, 200) may further include one or more elements. For example, the control unit (120) may be configured by a set of one or more processors. As an example, the control unit (120) may be configured by a set of a communication control processor, an application processor, an Electronic Control Unit (ECU), a graphical processing unit, and a memory control processor. As another example, the memory (130) may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 25 will be described in detail with reference to the drawings.

Figure 26:
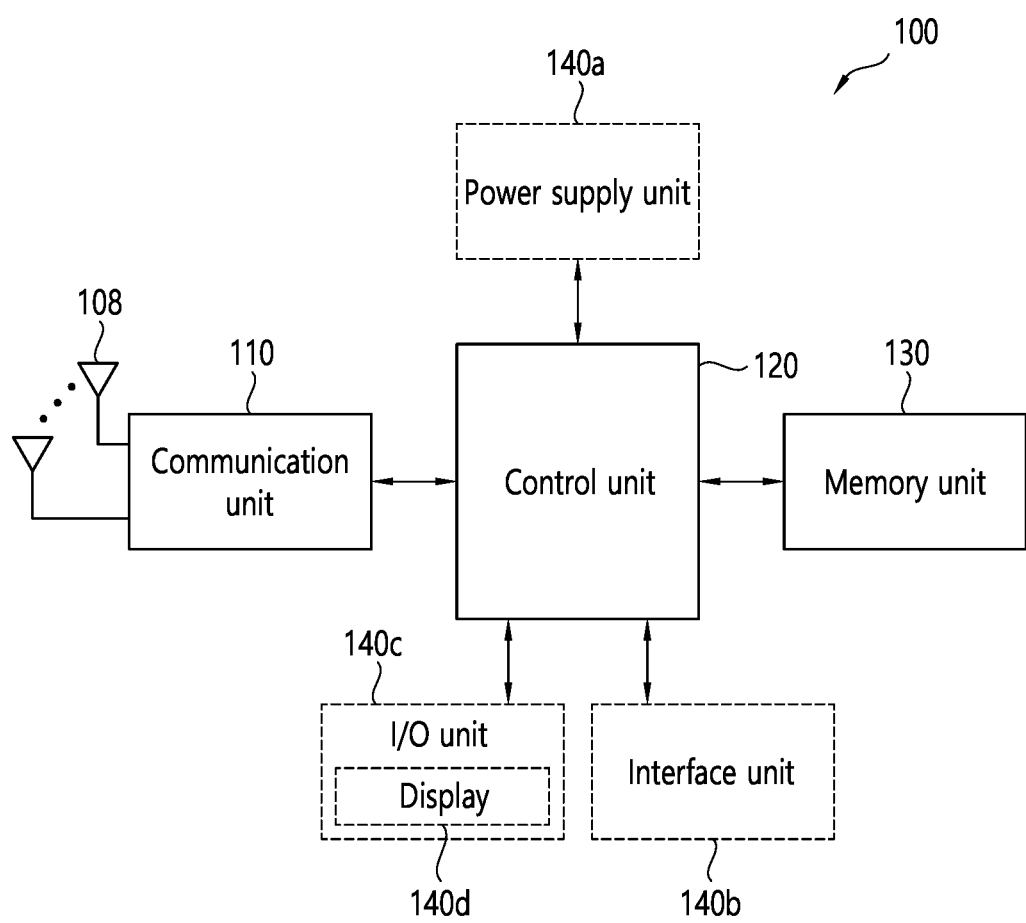
FIG. 26 shows a hand-held device, in accordance with an embodiment of the present disclosure.

FIG. 26 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 26, a hand-held device (100) may include an antenna unit (108), a communication unit (110), a control unit (120), a memory unit (130), a power supply unit (140a), an interface unit (140b), and an I/O unit (140c). The antenna unit (108) may be configured as a part of the communication unit (110). Blocks 110~130/140a~140c correspond to the blocks 110~130/140 of FIG. 25, respectively.

The communication unit (110) may transmit and receive signals (e.g., data and control signals) to and from other wireless devices or BSs. The control unit (120) may perform various operations by controlling constituent elements of the hand-held device (100). The control unit (120) may include an Application Processor (AP). The memory unit (130) may store data/parameters/programs/code/commands needed to drive the hand-held device (100). The memory unit (130) may store input/output data/information. The power supply unit (140a) may supply power to the hand-held device (100) and include a wired/wireless charging circuit, a battery, and so on. The interface unit (140b) may support connection of the hand-held device (100) to other external devices. The interface unit (140b) may include various ports (e.g., an audio I/O port and a video I/O port) for connection with external devices. The I/O unit (140c) may input or output video information/signals, audio information/signals, data, and/or information input by a user. The I/O unit (140c) may include a camera, a microphone, a user input unit, a display unit (140d), a speaker, and/or a haptic module.

As an example, in the case of data communication, the I/O unit (140c) may obtain information/signals (e.g., touch, text, voice, images, or video) input by a user and the obtained information/signals may be stored in the memory unit (130). The communication unit (110) may convert the information/ signals stored in the memory into radio signals and transmit the converted radio signals to other wireless devices directly or to a BS. The communication unit (110) may receive radio signals from other wireless devices or the BS and then restore the received radio signals into original information/ signals. The restored information/signals may be stored in the memory unit (130) and may be output as various types (e.g., text, voice, images, video, or haptic) through the I/O unit (140*c*).

Figure 27:
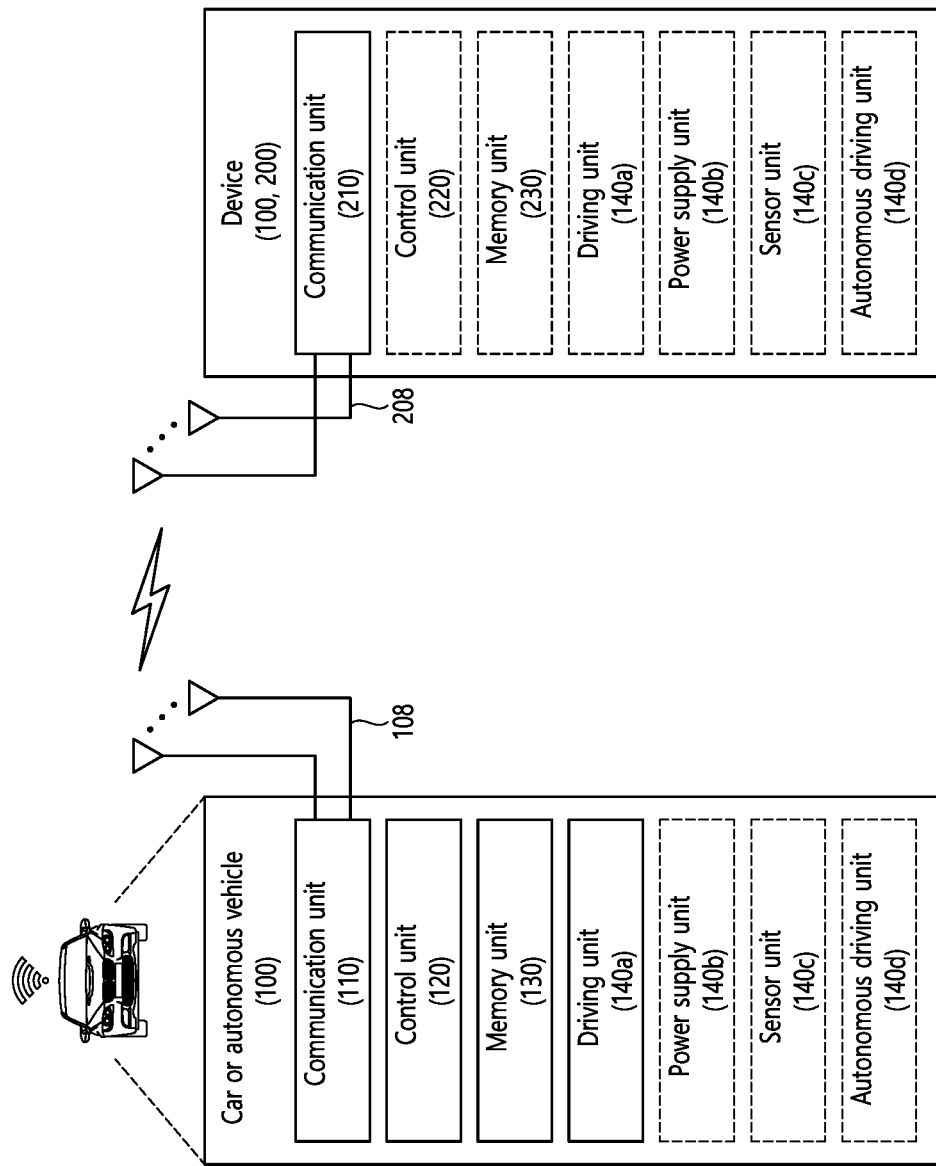
FIG. 27 shows a vehicle or an autonomous vehicle, in accordance with an embodiment of the present disclosure.

FIG. 27 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, and so on.

Referring to FIG. 27, a vehicle or autonomous vehicle (100) may include an antenna unit (108), a communication unit (110), a control unit (120), a driving unit (140*a*), a power supply unit (140*b*), a sensor unit (140*c*), and an autonomous driving unit (140*d*). The antenna unit (108) may be configured as a part of the communication unit (110). The blocks 110/130/140*a*~140*d* correspond to the blocks 110/130/140 of FIG. 25, respectively.

The communication unit (110) may transmit and receive signals (e.g., data and control signals) to and from external devices such as other vehicles, BSs (e.g., gNBs and road side units), and servers. The control unit (120) may perform various operations by controlling elements of the vehicle or the autonomous vehicle (100). The control unit (120) may include an Electronic Control Unit (ECU). The driving unit (140*a*) may cause the vehicle or the autonomous vehicle (100) to drive on a road. The driving unit (140*a*) may include an engine, a motor, a powertrain, a wheel, a brake, a steering device, and so on. The power supply unit (140*b*) may supply power to the vehicle or the autonomous vehicle (100) and include a wired/wireless charging circuit, a battery, and so on. The sensor unit (140*c*) may obtain a vehicle state, ambient environment information, user information, and so on. The sensor unit (140*c*) may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit (140*d*) may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit (110) may receive map data, traffic information data, and so on, from an external server. The autonomous driving unit (140*d*) may generate an autonomous driving path and a driving plan from the obtained data. The control unit (120) may control the driving unit (140*a*) such that the vehicle or the autonomous vehicle (100) may move along the autonomous driving path according to the driving plan (e.g., speed/direction control). In the middle of autonomous driving, the communication unit (110) may aperiodically/periodically obtain recent traffic information data from the external server and obtain surrounding traffic information data from neighboring vehicles. In the middle of autonomous driving, the sensor unit (140*c*) may obtain a vehicle state and/or surrounding environment information. The autonomous driving unit (140*d*) may update the autonomous driving path and the driving plan based on the newly obtained data/information. The communication unit (110) may transfer information on a vehicle position, the autonomous driving path, and/or the driving plan to the external server. The external server may predict traffic information data using AI technology, and so on, based on the information collected from vehicles or autonomous vehicles and provide the predicted traffic information data to the vehicles or the autonomous vehicles.

Figure 28:
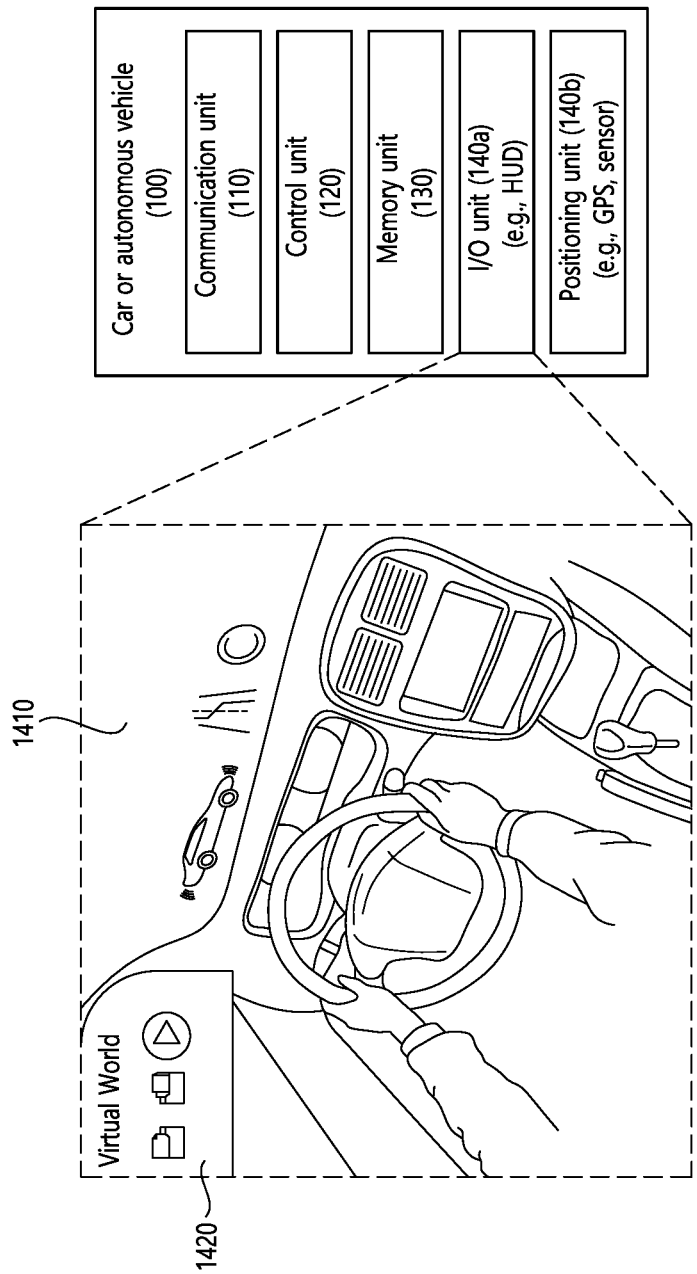
FIG. 28 shows a vehicle, in accordance with an embodiment of the present disclosure.

FIG. 28 shows a vehicle, in accordance with an embodiment of the present disclosure. The vehicle may be implemented as a transport means, an aerial vehicle, a ship, and so on.

Referring to FIG. 28, a vehicle (100) may include a communication unit (110), a control unit (120), a memory unit (130), an I/O unit (140*a*), and a positioning unit (140*b*). Herein, the blocks 110~130/140*a*~140*b* correspond to blocks 110~130/140 of FIG. 25.

The communication unit (110) may transmit and receive signals (e.g., data and control signals) to and from external devices such as other vehicles or BSs. The control unit (120) may perform various operations by controlling constituent elements of the vehicle (100). The memory unit (130) may store data/parameters/programs/code/commands for supporting various functions of the vehicle (100). The I/O unit (140*a*) may output an AR/VR object based on information within the memory unit (130). The I/O unit (140*a*) may include an HUD. The positioning unit (140*b*) may obtain information on the position of the vehicle (100). The position information may include information on an absolute position of the vehicle (100), information on the position of the vehicle (100) within a traveling lane, acceleration information, and information on the position of the vehicle (100) from a neighboring vehicle. The positioning unit (140*b*) may include a GPS and various sensors.

As an example, the communication unit (110) of the vehicle (100) may receive map information and traffic information from an external server and store the received information in the memory unit (130). The positioning unit (140*b*) may obtain the vehicle position information through the GPS and various sensors and store the obtained information in the memory unit (130). The control unit (120) may generate a virtual object based on the map information, traffic information, and vehicle position information and the I/O unit (140*a*) may display the generated virtual object in a window in the vehicle (1410, 1420). The control unit (120) may determine whether the vehicle (100) normally drives within a traveling lane, based on the vehicle position information. If the vehicle (100) abnormally exits from the traveling lane, the control unit (120) may display a warning on the window in the vehicle through the I/O unit (140*a*). In addition, the control unit (120) may broadcast a warning message regarding driving abnormity to neighboring vehicles through the communication unit (110). According to situation, the control unit (120) may transmit the vehicle position information and the information on driving/vehicle abnormality to related organizations.

Figure 29:
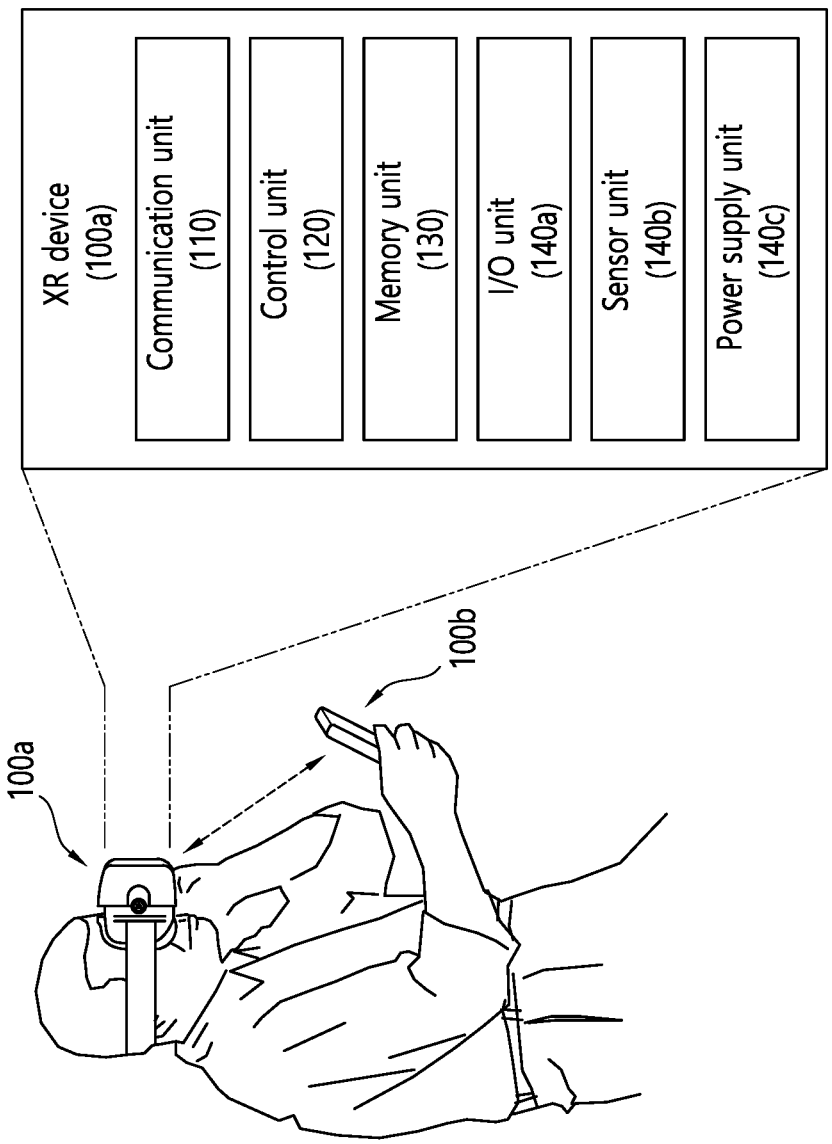
FIG. 29 shows an XR device, in accordance with an embodiment of the present disclosure.

FIG. 29 shows an XR device, in accordance with an embodiment of the present disclosure. The XR device may be implemented by an HMD, an HUD mounted in a vehicle, a television, a smartphone, a computer, a wearable device, a home appliance, a digital signage, a vehicle, a robot, and so on.

Referring to FIG. 29, an XR device (100*a*) may include a communication unit (110), a control unit (120), a memory unit (130), an I/O unit (140*a*), a sensor unit (140*b*), and a power supply unit (140c). Herein, the blocks 110~130/ 140a~140c correspond to the blocks 110~130/140 of FIG. 25, respectively.

The communication unit (110) may transmit and receive signals (e.g., media data and control signals) to and from external devices such as other wireless devices, hand-held devices, or media servers. The media data may include video, images, and sound. The control unit (120) may perform various operations by controlling constituent elements of the XR device (100a). For example, the control unit (120) may be configured to control and/or perform procedures such as video/image acquisition, (video/image) encoding, and metadata generation and processing. The memory unit (130) may store data/parameters/programs/code/commands needed to drive the XR device (100a)/generate XR object. The I/O unit (140a) may obtain control information and data from the exterior and output the generated XR object. The I/O unit (140a) may include a camera, a microphone, a user input unit, a display unit, a speaker, and/or a haptic module. The sensor unit (140b) may obtain an XR device state, surrounding environment information, user information, and so on. The sensor unit (140b) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit (140c) may supply power to the XR device (100a) and include a wired/wireless charging circuit, a battery, and so on.

For example, the memory unit (130) of the XR device (100a) may include information (e.g., data) needed to generate the XR object (e.g., an AR/VR/MR object). The I/O unit (140a) may receive a command for manipulating the XR device (100a) from a user and the control unit (120) may drive the XR device (100a) according to a driving command of a user. For example, when a user desires to watch a film or news through the XR device (100a), the control unit (120) transmits content request information to another device (e.g., a hand-held device 100b) or a media server through the communication unit (130). The communication unit (130) may download/stream content such as films or news from another device (e.g., the hand-held device 100b) or the media server to the memory unit (130). The control unit (120) may control and/or perform procedures such as video/ image acquisition, (video/image) encoding, and metadata generation/processing with respect to the content and generate/output the XR object based on information on a surrounding space or a real object obtained through the I/O unit (140a)/sensor unit (140b).

The XR device (100a) may be wirelessly connected to the hand-held device (100b) through the communication unit (110) and the operation of the XR device (100a) may be controlled by the hand-held device (100b). For example, the hand-held device (100b) may operate as a controller of the XR device (100a). To this end, the XR device (100a) may obtain information on a 3D position of the hand-held device (100b) and generate and output an XR object corresponding to the hand-held device (100b).

Figure 30:
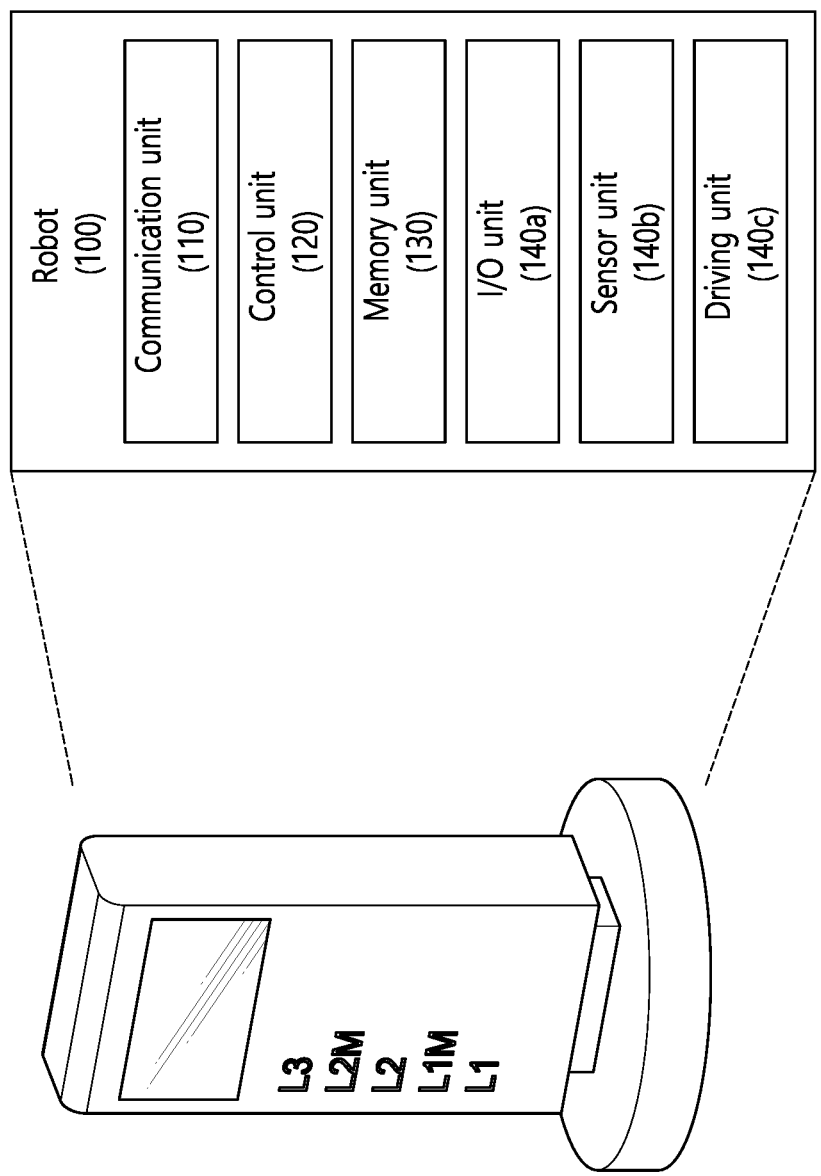
FIG. 30 shows a robot, in accordance with an embodiment of the present disclosure.

FIG. 30 shows a robot, in accordance with an embodiment of the present disclosure. The robot may be categorized into an industrial robot, a medical robot, a household robot, a military robot, and so on, according to a used purpose or field.

Referring to FIG. 30, a robot (100) may include a communication unit (110), a control unit (120), a memory unit (130), an I/O unit (140a), a sensor unit (140b), and a driving unit (140c). Herein, the blocks 110~130/140a~140c correspond to the blocks 110~130/140 of FIG. 25, respectively.

The communication unit (110) may transmit and receive signals (e.g., driving information and control signals) to and from external devices such as other wireless devices, other robots, or control servers. The control unit (120) may perform various operations by controlling constituent elements of the robot (100). The memory unit (130) may store data/parameters/programs/code/commands for supporting various functions of the robot (100). The I/O unit (140a) may obtain information from the exterior of the robot (100) and output information to the exterior of the robot (100). The I/O unit (140a) may include a camera, a microphone, a user input unit, a display unit, a speaker, and/or a haptic module. The sensor unit (140b) may obtain internal information of the robot (100), surrounding environment information, user information, and so on. The sensor unit (140b) may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, and so on. The driving unit (140c) may perform various physical operations such as movement of robot joints. In addition, the driving unit (140c) may cause the robot (100) to travel on the road or to fly. The driving unit (140c) may include an actuator, a motor, a wheel, a brake, a propeller, and so on.

Figure 31:
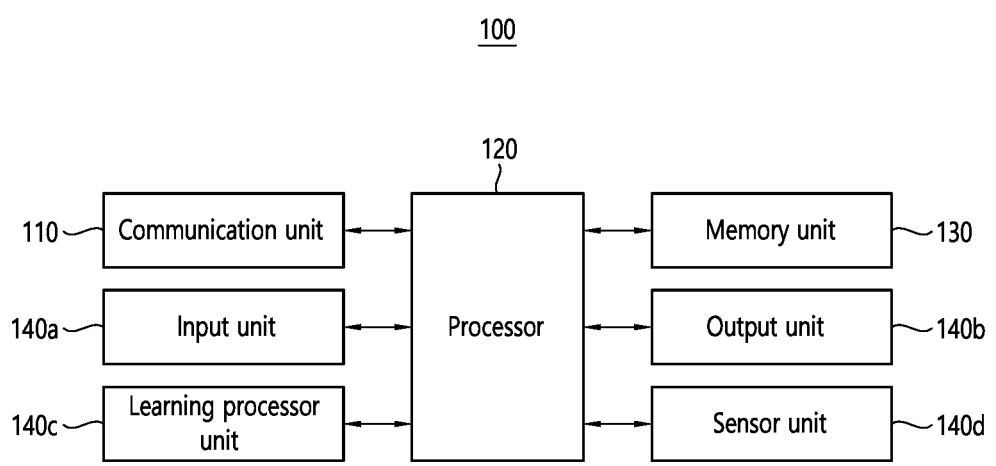
FIG. 31 shows an AI device, in accordance with an embodiment of the present disclosure.

FIG. 31 shows an AI device, in accordance with an embodiment of the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, and so on.

Referring to FIG. 31, an AI device (100) may include a communication unit (110), a control unit (120), a memory unit (130), an I/O unit (140a/140b), a learning processor unit (140c), and a sensor unit (140d). The blocks 110~130/ 140a~140d correspond to blocks 110~130/140 of FIG. 25, respectively.

The communication unit (110) may transmit and receive wired/radio signals (e.g., sensor information, user input, learning models, or control signals) to and from external devices such as other AI devices (e.g., 100x, 200, 400 of FIG. 22) or an AI server (e.g., 400 of FIG. 22) using wired/wireless communication technology. To this end, the communication unit (110) may transmit information within the memory unit (130) to an external device and transmit a signal received from the external device to the memory unit (130).

The control unit (120) may determine at least one feasible operation of the AI device (100), based on information which is determined or generated using a data analysis algorithm or a machine learning algorithm. The control unit (120) may perform an operation determined by controlling constituent elements of the AI device (100). For example, the control unit (120) may request, search, receive, or use data of the learning processor unit (140c) or the memory unit (130) and control the constituent elements of the AI device (100) to perform a predicted operation or an operation determined to be preferred among at least one feasible operation. The control unit (120) may collect history information including the operation contents of the AI device (100) and operation feedback by a user and store the collected information in the memory unit (130) or the learning processor unit (140c) or transmit the collected information to an external device such as an AI server (400 of FIG. 22). The collected history information may be used to update a learning model.

The memory unit (130) may store data for supporting various functions of the AI device (100). For example, the memory unit (130) may store data obtained from the input unit (140*a*), data obtained from the communication unit (110), output data of the learning processor unit (140*c*), and data obtained from the sensor unit (140). The memory unit (130) may store control information and/or software code needed to operate/drive the control unit (120).

The input unit (140*a*) may obtain various types of data from the exterior of the AI device (100). For example, the input unit (140*a*) may obtain learning data for model learning, and input data to which the learning model is to be applied. The input unit (140*a*) may include a camera, a microphone, and/or a user input unit. The output unit (140*b*) may generate output related to a visual, auditory, or tactile sense. The output unit (140*b*) may include a display unit, a speaker, and/or a haptic module. The sensing unit (140) may obtain at least one of internal information of the AI device (100), surrounding environment information of the AI device (100), and user information, using various sensors. The sensor unit (140) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit (140*c*) may learn a model consisting of artificial neural networks, using learning data. The learning processor unit (140*c*) may perform AI processing together with the learning processor unit of the AI server (400 of FIG. 23). The learning processor unit (140*c*) may process information received from an external device through the communication unit (110) and/or information stored in the memory unit (130). In addition, an output value of the learning processor unit (140*c*) may be transmitted to the external device through the communication unit (110) and may be stored in the memory unit (130).

What is claimed is:

1. A method performed by a first terminal, comprising:
   joining a cluster including a plurality of terminals,
      wherein the plurality of terminals and the first terminal constituting the cluster are in an equal relationship and have no dependent relationship;
   receiving cluster information from the plurality of terminals alternately based on a transmission period,
      wherein the cluster information includes a cluster parameter estimated by each of the plurality of terminals at a time each of the plurality of terminals transmits the cluster information, and
      wherein the cluster parameter includes a center position of the cluster and a velocity of the cluster;
   estimating a latest cluster parameter based on i) the received cluster information, and ii) a location of the first terminal and a velocity of the first terminal which are based on a time at which the first terminal attempts to transmit the cluster information; and
   transmitting latest cluster information including the latest cluster parameter.

2. The method of claim 1, wherein the first terminal periodically transmits the latest cluster information based on a first period, and
   wherein the first period is equal to a product of the transmission period and a number of terminals constituting the cluster.

3. The method of claim 2, wherein each of the plurality of terminals periodically transmits the cluster information based on the first period.

4. The method of claim 1, wherein the location of the first terminal is a most recent location measured by the first terminal.

5. The method of claim 1, wherein the location of the first terminal is an average value of an amount of location change of the first terminal during a first time interval.

6. The method of claim 1, wherein the velocity of the first terminal is a most recent velocity measured by the first terminal.

7. The method of claim 1, wherein the velocity of the first terminal is an average value of an amount of speed change of the first terminal during a second time interval.

8. The method of claim 1, wherein the cluster information or the latest cluster information is transmitted as a broadcast.

9. The method of claim 1,
   wherein the first terminal determines whether to leave the cluster based on the received cluster information.

10. The method of claim 1, wherein the cluster information or the latest cluster information includes a number of terminals constituting the cluster or a number of terminals leaving the cluster among the terminals constituting the cluster.

11. The method of claim 1, wherein a difference between a speed of each of terminals constituting the cluster and an average speed of the cluster is less than or equal to a speed threshold,
   wherein a difference between a moving direction of each of the terminals constituting the cluster and an average moving direction of the cluster is less than or equal to a direction threshold, and
   wherein the cluster has an area equal to or less than a coverage threshold.

12. The method of claim 1, wherein the velocity is a vector value including a speed of the cluster and a moving direction of the cluster.

13. A terminal comprising:
   at least one memory storing instructions;
   at least one transceiver; and
   at least one processor operably coupled to the at least one memory and the at least one transceiver,
   wherein the instructions perform operations, based on being executed by the at least one processor, comprising:
   joining a cluster including a plurality of terminals,
      wherein the plurality of terminals and a first terminal constituting the cluster are in an equal relationship and have no dependent relationship;
   receiving, via the at least one transceiver, cluster information from the plurality of terminals alternately based on a transmission period,
      wherein the cluster information includes a cluster parameter estimated by each of the plurality of terminals at a time each of the plurality of terminals transmits the cluster information, and
      wherein the cluster parameter includes a center position of the cluster and a velocity of the cluster;
   estimating a latest cluster parameter based on i) the received cluster information, and ii) a location of the first terminal and a velocity of the first terminal, which are based on a time at which the first terminal attempts to transmit the cluster information; and
   transmitting, via the at least one transceiver, latest cluster information including the latest cluster parameter.

14. The terminal of claim 13, wherein the first terminal is associated with a vulnerable road user (VRU).

15. A processing apparatus configured to control a first terminal, the processing apparatus comprising:
- at least one processor; and
- at least one memory operably coupled to the at least one processor and storing instructions,
- wherein the at least one processor perform operations comprising:
- joining a cluster including a plurality of terminals,
- wherein the plurality of terminals and the first terminal constituting the cluster are in an equal relationship and have no dependent relationship;
- obtaining cluster information from the plurality of terminals alternately based on a transmission period,
- wherein the cluster information includes a cluster parameter estimated by each of the plurality of terminals at a time each of the plurality of terminals transmits the cluster information, and
- wherein the cluster parameter includes a center position of the cluster and a velocity of the cluster;
- estimating a latest cluster parameter based on i) the obtained cluster information, and ii) a location of the first terminal and a velocity of the first terminal, which are based on a time at which the first terminal attempts to transmit the cluster information; and
- generating latest cluster information including the latest cluster parameter.

* * * * *